United States Patent
Kim et al.

(10) Patent No.: US 11,243,577 B2
(45) Date of Patent: Feb. 8, 2022

(54) FLEXIBLE DISPLAY DEVICE

(71) Applicant: LG ELECTRONICS INC., Seoul (KR)

(72) Inventors: Jaewook Kim, Seoul (KR); Insu Song, Seoul (KR); Minsoo Kim, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

(21) Appl. No.: 16/893,157

(22) Filed: Jun. 4, 2020

(65) Prior Publication Data
US 2021/0191472 A1    Jun. 24, 2021

(30) Foreign Application Priority Data

Dec. 24, 2019   (WO) ................ PCT/KR2019/018363

(51) Int. Cl.
*G06F 1/16*        (2006.01)
(52) U.S. Cl.
CPC .......... *G06F 1/1656* (2013.01); *G06F 1/1652* (2013.01); *G06F 1/1686* (2013.01)
(58) Field of Classification Search
CPC .... G06F 1/1652; G06F 1/1675; G06F 1/1615; G09F 9/301
See application file for complete search history.

(56) References Cited

U.S. PATENT DOCUMENTS

| | | | | |
|---|---|---|---|---|
| 9,829,925 B2* | 11/2017 | Lim | ...................... | G06F 1/1652 |
| 10,008,135 B2* | 6/2018 | Lim | ..................... | H05K 5/0226 |
| 10,448,521 B2* | 10/2019 | Seo | ......................... | G09F 9/301 |
| 2008/0198540 A1* | 8/2008 | Bemelmans | ........ | H04M 1/0268 |
| | | | | 361/679.06 |
| 2017/0010634 A1* | 1/2017 | Ahn | ..................... | H04M 1/0216 |
| 2017/0364119 A1 | 12/2017 | Lee et al. | | |
| 2019/0268455 A1* | 8/2019 | Baek | ...................... | G06F 1/1681 |
| 2020/0022271 A1* | 1/2020 | Park | ...................... | G06F 1/1626 |
| 2020/0253063 A1* | 8/2020 | Jiang | ..................... | G06F 1/1652 |
| 2020/0371558 A1* | 11/2020 | Kim | ...................... | G06F 1/1624 |

FOREIGN PATENT DOCUMENTS

| | | |
|---|---|---|
| KR | 1020160047100 | 5/2016 |
| KR | 1020170139175 | 12/2017 |
| KR | 1020190112535 | 10/2019 |
| KR | 1020190128843 | 11/2019 |

* cited by examiner

*Primary Examiner* — Anthony Q Edwards

(74) *Attorney, Agent, or Firm* — Lee, Hong, Degerman, Kang & Waimey PC

(57) ABSTRACT

The present disclosure relates to a flexible display device including a first body; a second body configured to be relatively movable with respect to the first body; a flexible display disposed on a front surface of the first body and a rear surface of the second body, and configured to vary in size of areas that are exposed to the front surface of the first body and to the rear surface of the second body as the first body and the second body are relatively moved; and a rear window unit detachably coupled to the rear surface of the second body, and configured to cover the flexible display exposed to the rear surface of the second body.

20 Claims, 20 Drawing Sheets

(a)

(b)

(a)

(b)

(a)       (b)

(a)

(b)

(a)

(b)

(a)

(b)

FLEXIBLE DISPLAY DEVICE

CROSS-REFERENCE TO RELATED APPLICATIONS

Pursuant to 35 U.S.C. § 119(a), this application claims the benefit of earlier filing date and right of priority to International Application No. PCT/KR2019/018363 filed on Dec. 24, 2019, the contents of which is incorporated by reference herein in its entirety.

TECHNICAL FIELD

The present disclosure relates to a flexible display device having a flexible display that can be deformed by an external force.

BACKGROUND ART

A portable electronic device (hereinafter, a mobile terminal) such as a communication terminal, a multimedia device, a portable computer, a game player, and a photographing device is provided with a display to display image information. A mobile terminal may also have a folding structure that can be folded into a smaller size for convenience of portability. In this type of electronic device, two bodies are connected by a folding structure (e.g., a hinge portion).

Since the related art display had a non-foldable structure, a structure in which a display is disposed over foldably connected two bodies could not be implemented. Therefore, a large screen could not actually be applied to an electronic device with a folding structure.

However, as a flexible display capable of bending has been developed recently, researches to apply a flexible display to a mobile terminal are being conducted, and thus, it is possible to implement a large screen on a device.

Such a flexible display device may realize various sizes of screen by using deformable characteristics of the flexible display. For example, a flexible display device that can be extended to a screen size desired by a user by allowing the flexible display to be drawn out of the device body to extend an area exposed outside may be considered.

Therefore, it is necessary to propose a mechanism of a flexible display device in which a screen may be exposed to a front surface and a rear surface of a frame, respectively, and consider a method in which two frames (bodies) do not deviate from each other while providing smooth movement of the flexible display.

However, in a case of the flexible display in which a screen is exposed to front and rear surfaces of the frame, a cover may be provided to cover the screen exposed to the rear surface. In this case, dust or foreign substances may be introduced into the rear surface of the frame.

Such foreign substances may cause damage on a display disposed on the rear surface of the frame, and may cause damage between the cover and the flexible display as the flexible display slides.

Also, the foreign substances may cause a problem that visibility of the display disposed on the rear surface of a second body is lowered. In addition, the foreign substances introduced into a rear surface of the second body may be introduced between the second body and the display disposed on the second body, and subsequently be introduced into an inner space of a body.

DETAILED DESCRIPTION OF THE DISCLOSURE

Technical Problem

A first aspect of the present disclosure is to provide a flexible display device having a new mechanism of a rolling type to implement various screens of a flexible display.

A second aspect of the present disclosure is to provide a structure of the flexible display device capable of easily removing foreign substances that may be introduced between the flexible display disposed on a rear surface of a frame and a cover covering the flexible display.

TECHNICAL SOLUTION

To achieve the above aspect and other advantages of the present disclosure, there is provided a flexible display device including: a first body; a second body configured to be relatively movable with respect to the first body; a flexible display disposed on a front surface of the first body and a rear surface of the second body, and configured to vary in size of areas that are exposed to the front surface of the first body and to the rear surface of the second body as the first body and the second body are relatively moved; and a rear window unit detachably coupled to the rear surface of the second body, and configured to cover the flexible display exposed to the rear surface of the second body.

As another example, the first body and the second body may be implemented in a first state of being located adjacent to each other and an area where the flexible display is exposed to the rear surface of the second body is largest, a second state of being moved away from each other and an area where the flexible display exposed to the front surface of the first body is largest, and a stroke state in which the first state and the second state are interchanged with each other.

As another example, the rear window unit may include a frame detachably coupled to the rear surface of the second body, and a rear window coupled to the frame and configured to cover the flexible display exposed to the rear surface of the second body in the first state.

As another example, the second body may include a rotary ejector configured to press the frame or the rear window as the rotary ejector is rotated so that the rear window unit is separated from the second body.

As another example, the rotary ejector may include a rotation shaft inserted into the second body, and a hook protruding from the rotation shaft in a direction forming an angle with a lengthwise direction of the rotation shaft so as to press the frame or the rear window as the rotation shaft is rotated.

As another example, the frame may form a rectangular edge covering the flexible display exposed to the rear surface of the second body in the first state, and may be made of a stainless steel (SUS, Steel Use Stainless) material to which a magnetic force is applied.

As another example, the second body may include magnets provided in plural and arranged to be spaced apart from each other along the edge of the frame.

As another example, the frame may include a protrusion bent and protruded from a corner of the frame toward the second body.

As another example, the second body may include a fixing clip disposed at a position corresponding to the protrusion and at least a part of the protrusion is fixedly inserted into the fixing clip.

As another example, the frame may further include an outside hook disposed on one side of the edge and extended in a lengthwise direction of the edge, and wherein an outside hook groove into which the outside hook is inserted is formed in the second body.

As another example, the frame may further include an inside hook disposed on an opposite side of the one side of the edge and protruded toward the second body, and the inside hook is fixable by the rotary ejector.

As another example, the outside hook groove may be formed such that the outside hook is inserted into the outside hook groove in a diagonal direction, and the inside hook may be brought into contact with and fixed to a lower portion of a hook of the rotary ejector as the frame moves toward the second body after the outside hook is inserted into the outside hook groove.

As another example, the hook of the rotary ejector may include a first surface supporting an upper surface of at least a part of the inside hook, and a second surface formed above the first surface and disposed adjacent to the frame or to the rear window, and wherein the first surface may release the upper surface of the inside hook and the second surface may press the frame or the rear window as the hook of the rotary ejector rotates.

As another example, the frame further may further include a side frame extending from the rectangular edge and surrounding one side surface of the second body.

As another example, the frame may include a slide hook protruded and bent toward the second body, and an insertion groove into which the slide hook is inserted may be formed at the second body. The frame may be coupled with the second body in a manner that the slide hook is inserted into the insertion groove in one direction and then slides in a perpendicular direction with respect to the one direction.

As another example, the rotary ejector may rotate as an ejector pin presses the rotary ejector, and subsequently the rotary ejector presses the frame in a direction opposite to a direction in which the ejector pin presses the rotary ejector.

As another example, a direction in which the rotary ejector presses the frame may be opposite to a direction in which the frame is inserted into the insertion groove and slid to be fixed to the insertion groove.

As another example, the rotary ejector may include a first hook protruding from the rotation shaft in one direction and being pressed by the ejector pin, and a second hook protruding from the rotation shaft in a direction opposite to the one direction and pressing the frame.

As another example, an insertion hole into which the ejector pin is inserted may be formed at the side frame, and the side frame may include a protrusion that is pressed by the second hook as the second hook is rotated.

As another example, the second body may further include an elastic body pressing the first hook toward the side frame.

As another example, the flexible display device may further include a prevention pad disposed to cover a gap between the flexible display and the second body, and preventing foreign substances from entering the gap between the flexible display and the second body.

Advantageous Effects

The effects of the present disclosure to be obtained by the above-described solutions are as follows.

First, by separating a rear window unit from a second body, a user can remove dust or foreign substances that may be introduced into the flexible display disposed on the rear surface of the second body. Therefore, the flexible display disposed on the rear surface of the second body may be more easily protected and managed.

Second, since the frame of the rear window unit is integrally formed with the side frame, the flexible display disposed on the side surface of the second body is also exposed when the rear window unit is separated from the second body. Accordingly, foreign substances introduced into the flexible display that is disposed on the side surface of the second body can be removed.

Third, since the rear window unit includes the side frame, a user can grip the side frame during coupling and detaching process of the rear window unit, thereby enabling more stable coupling and detaching process.

Fourth, as the rotary ejector is disposed adjacent to the side frame, it is possible to implement coupling or detaching process in a sliding manner.

Figure 2:
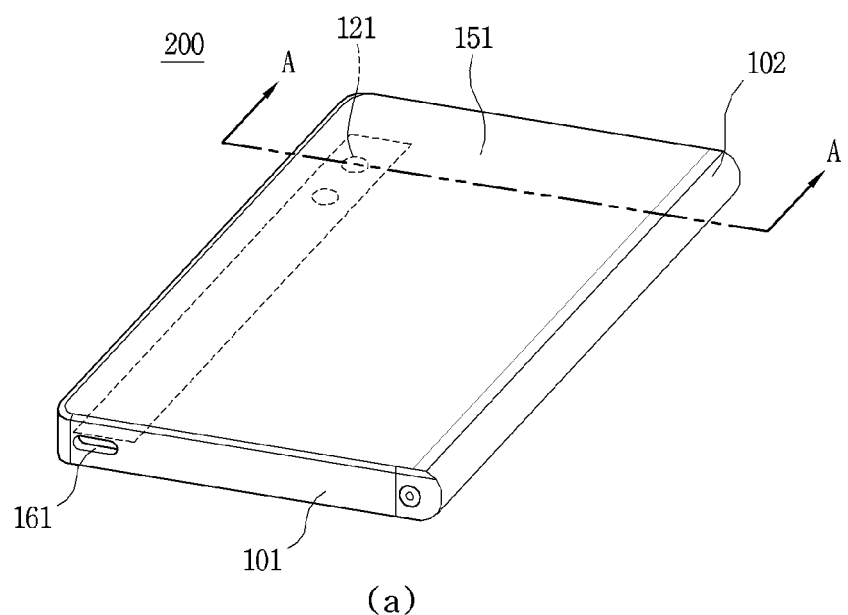
Figure 2:
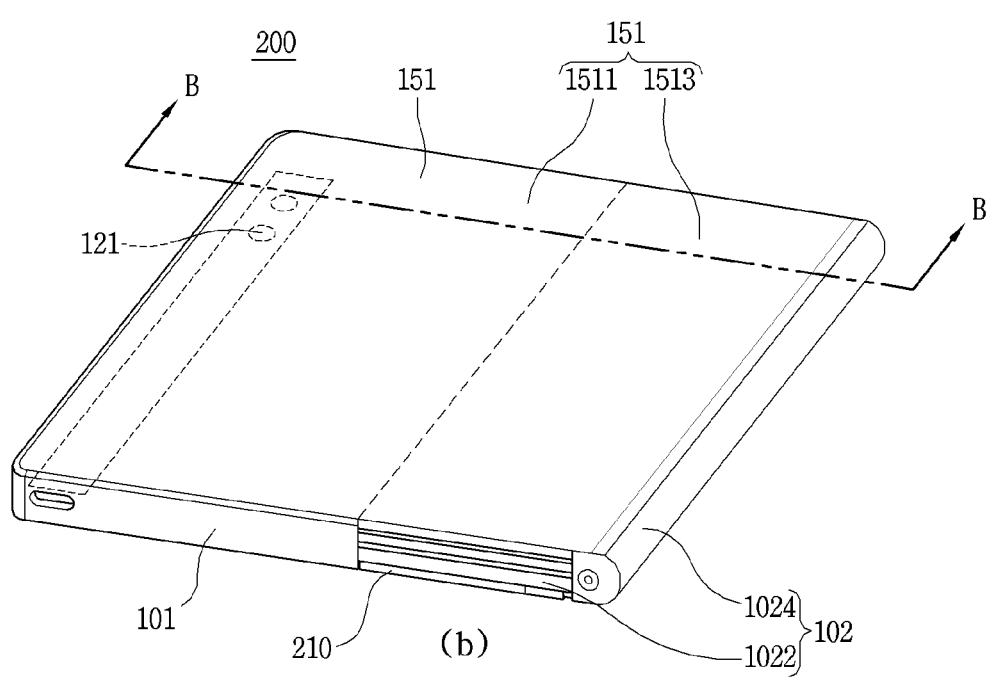

(a) and (b) of FIG. 2 are perspective views illustrating an exterior appearance of a front surface of a flexible display device in a first state and in a second state, respectively.

Figure 3:
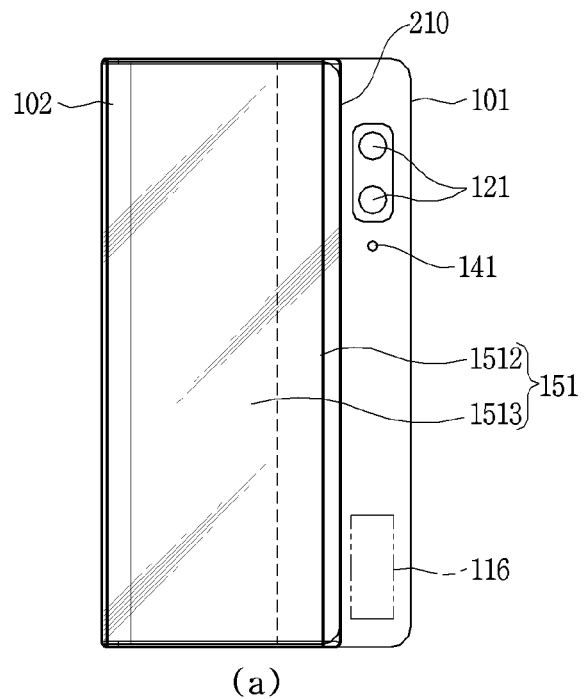
Figure 3:
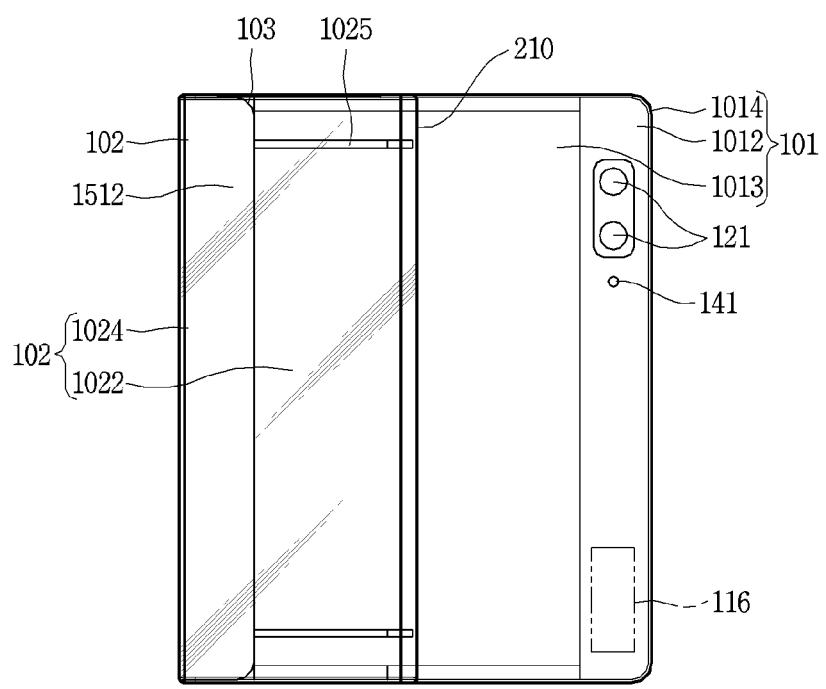

(a) and (b) of FIG. 3 are perspective views illustrating an exterior appearance of a rear surface of a flexible display device in a first state and in a second state, respectively.

Figure 4:
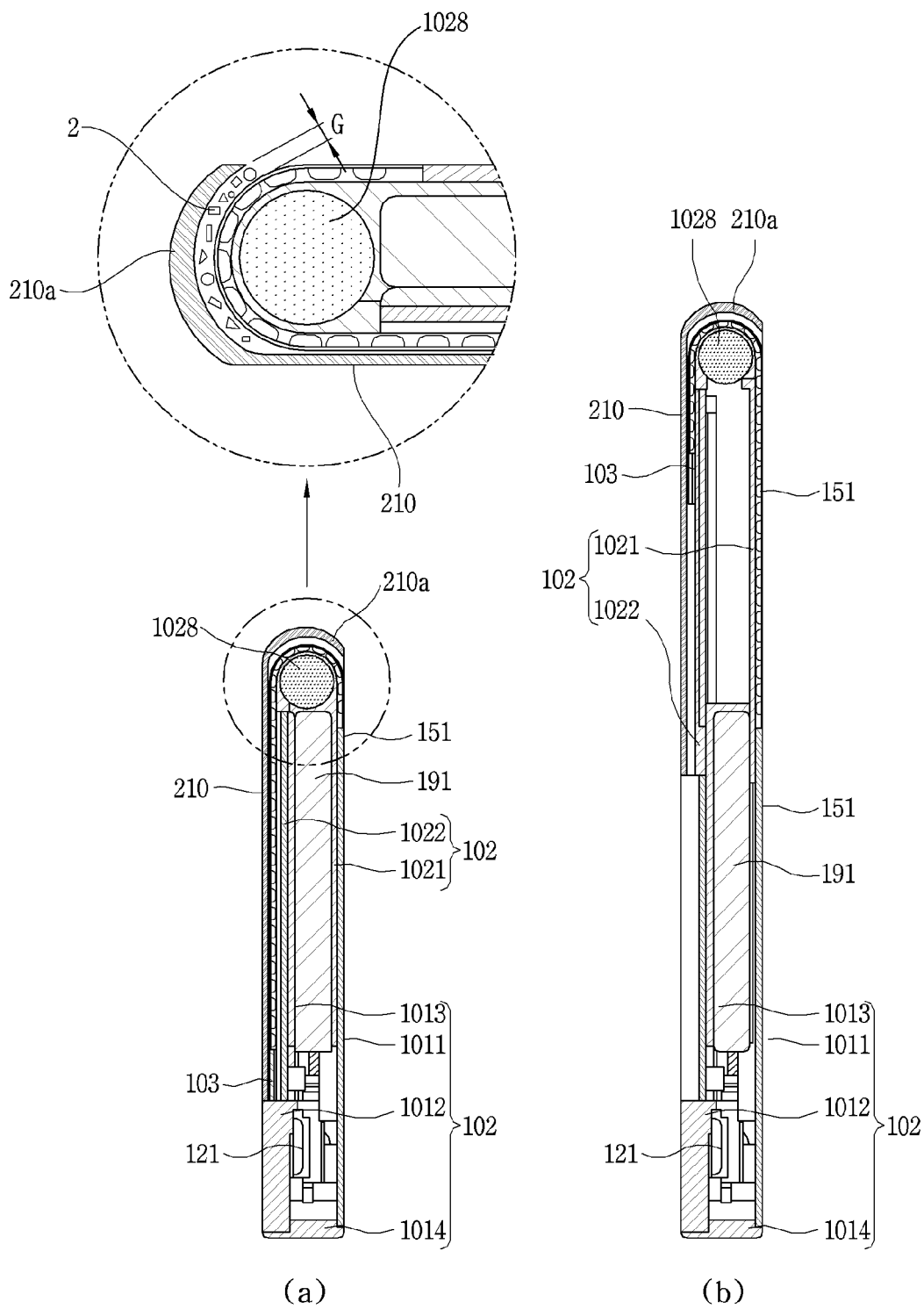

(a) of FIG. 4 is a cross-sectional view taken along a line A-A in (a) of FIG. 2, and (b) of FIG. 4 is a cross-sectional view taken along a line B-B in (b) of FIG. 2.

Figure 5:
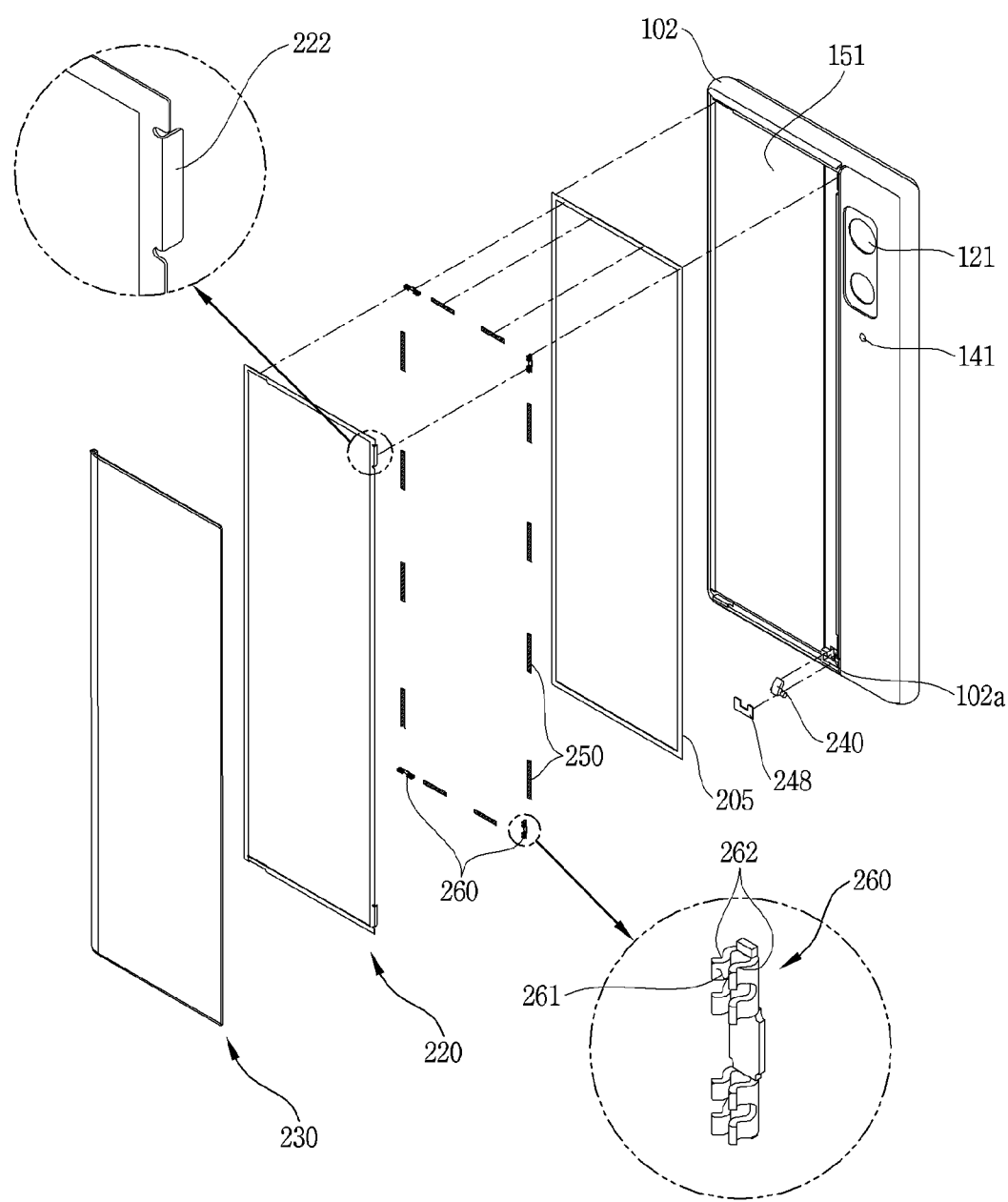

FIG. 5 is an exploded perspective view of a flexible display device according to an embodiment of the present disclosure.

Figure 6A:
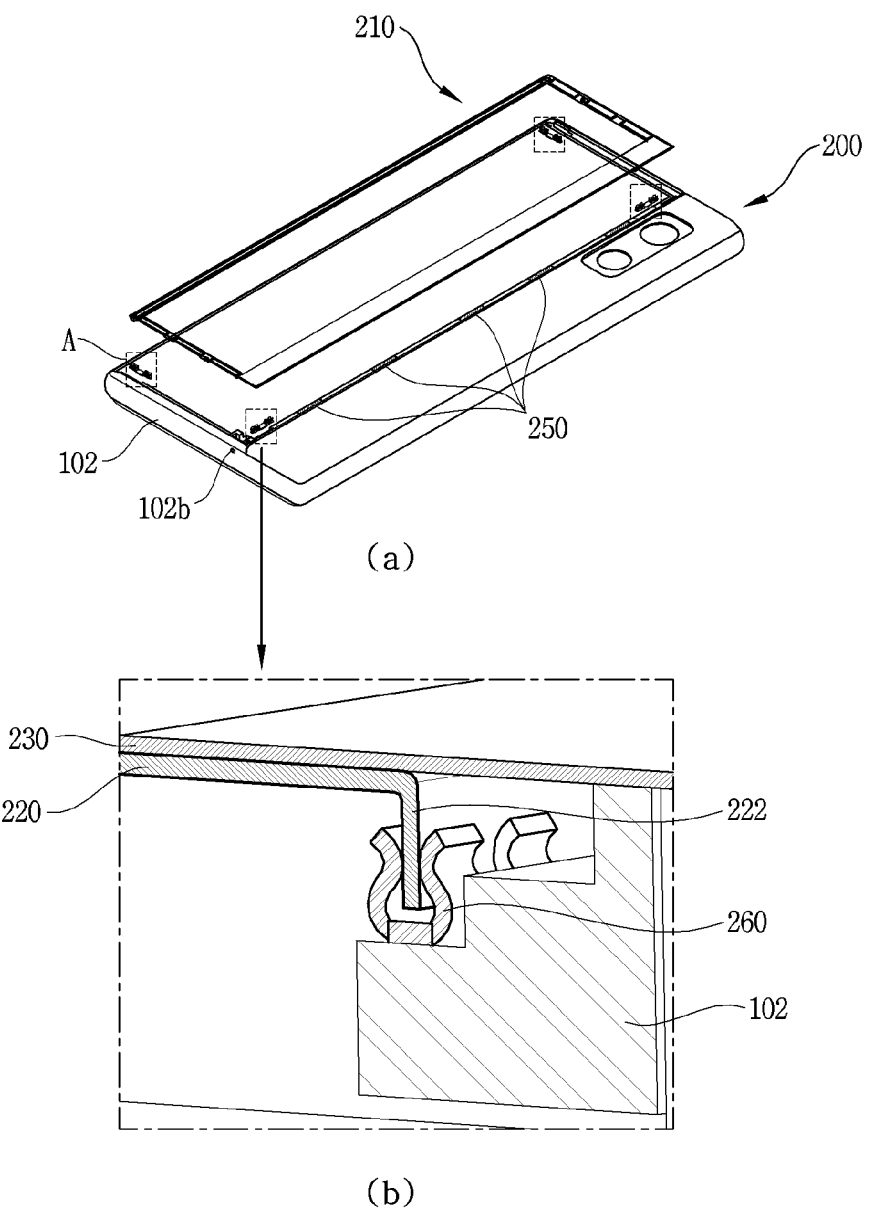
Figure 6B:
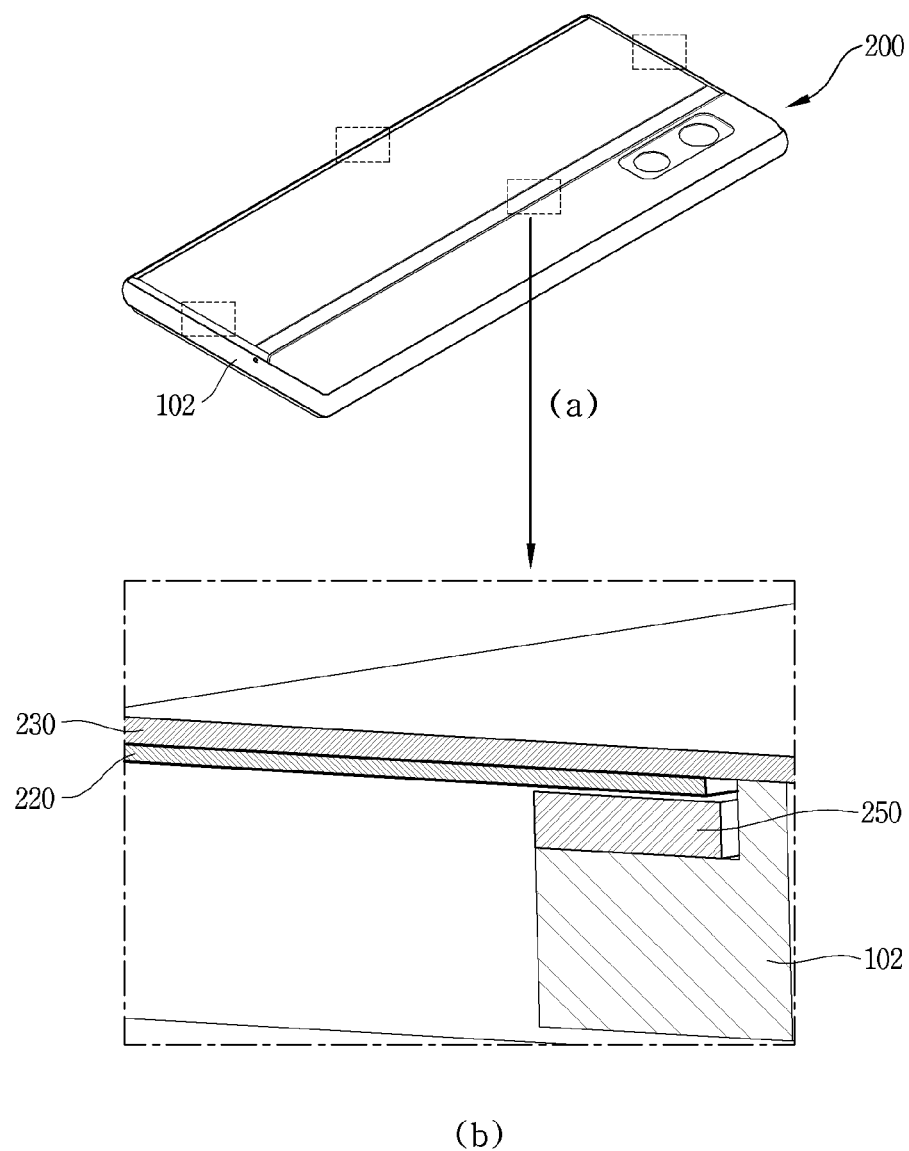

FIG. 6A is a perspective view and FIG. 6B is a cut perspective view illustrating a state in which the flexible display device illustrated in FIG. 5 is being coupled.

Figure 7:
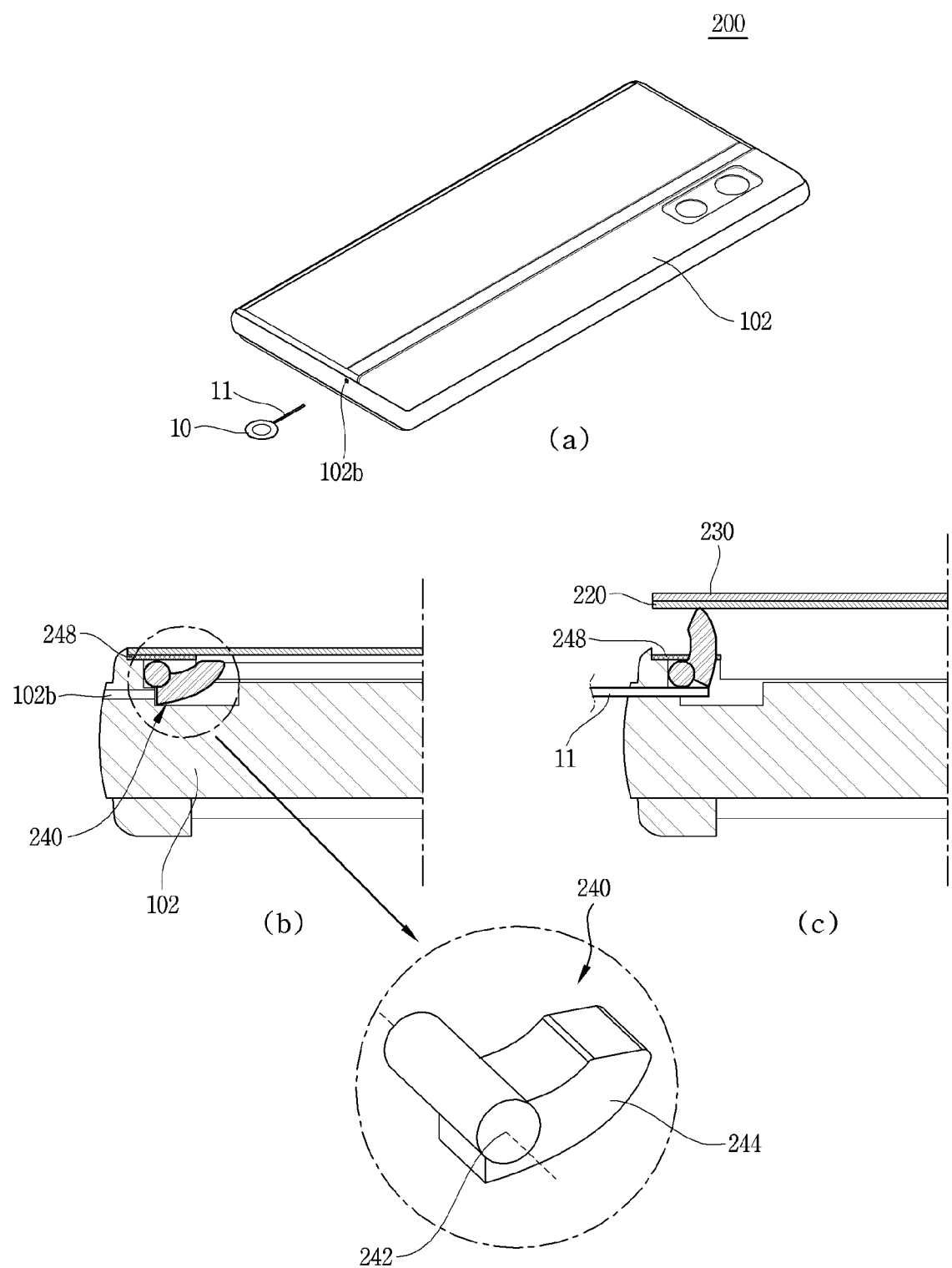

FIG. 7 is a view to describe a rotary ejector of the flexible display device illustrated in FIG. 5.

Figure 8:
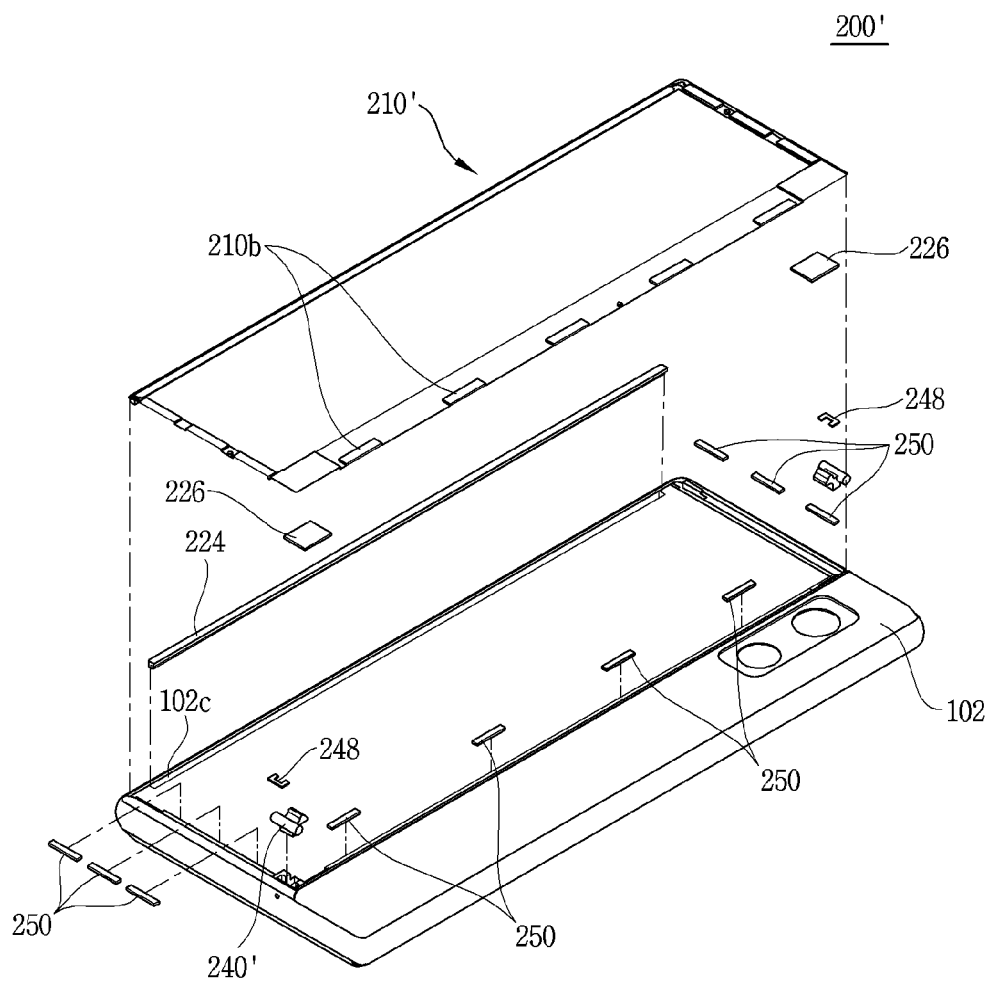

FIG. 8 is an exploded perspective view of a flexible display device according to another embodiment of the present disclosure.

Figure 9:
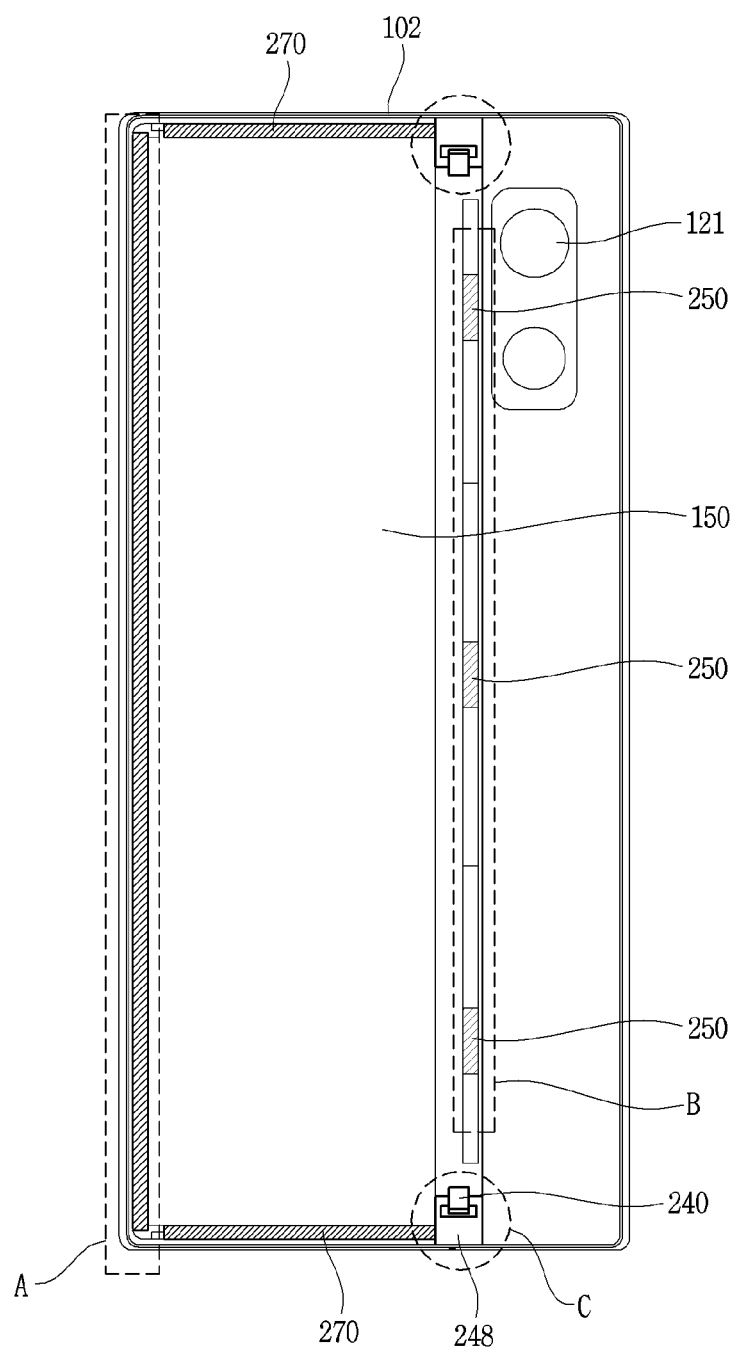

FIG. 9 is a view to describe a part in which a second body and a rear window unit of the flexible display device illustrated in FIG. 8 are coupled.

Figure 10A:
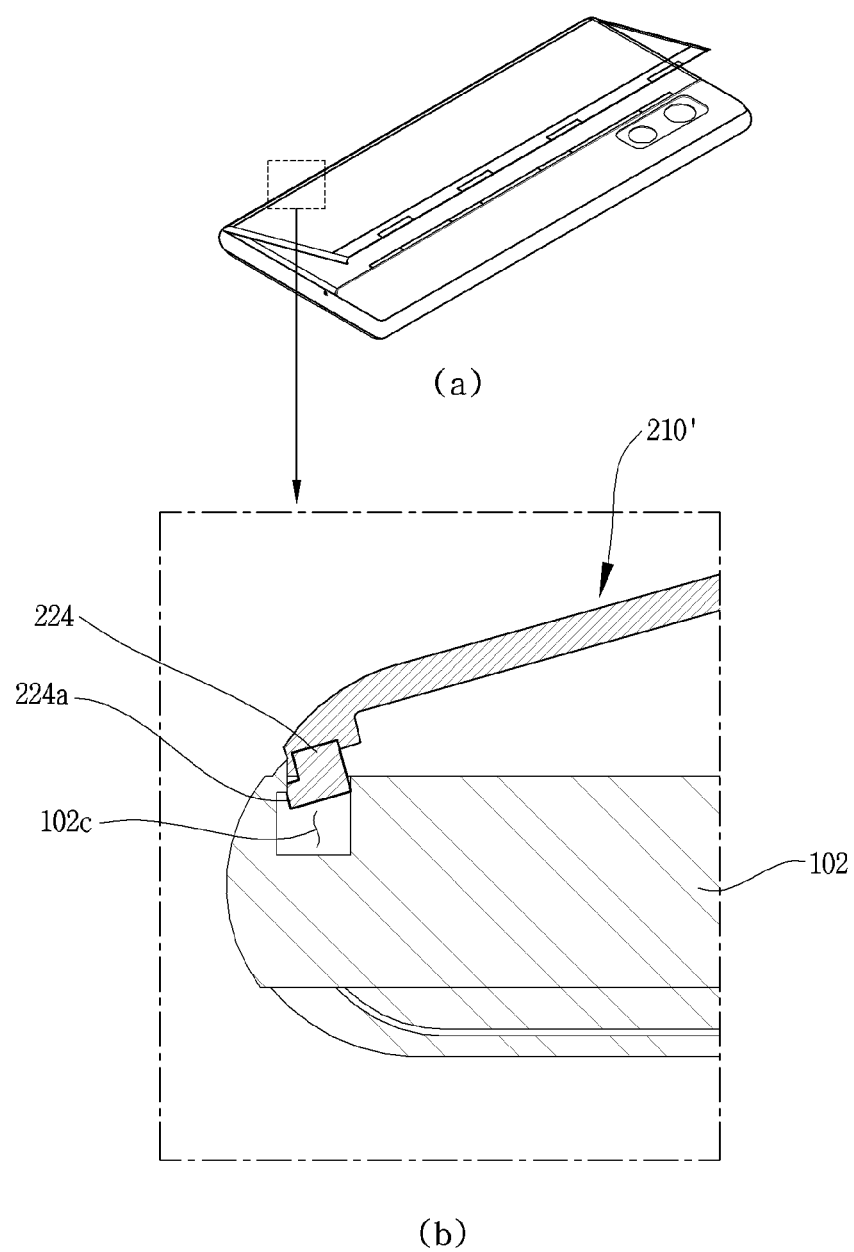
Figure 10B:
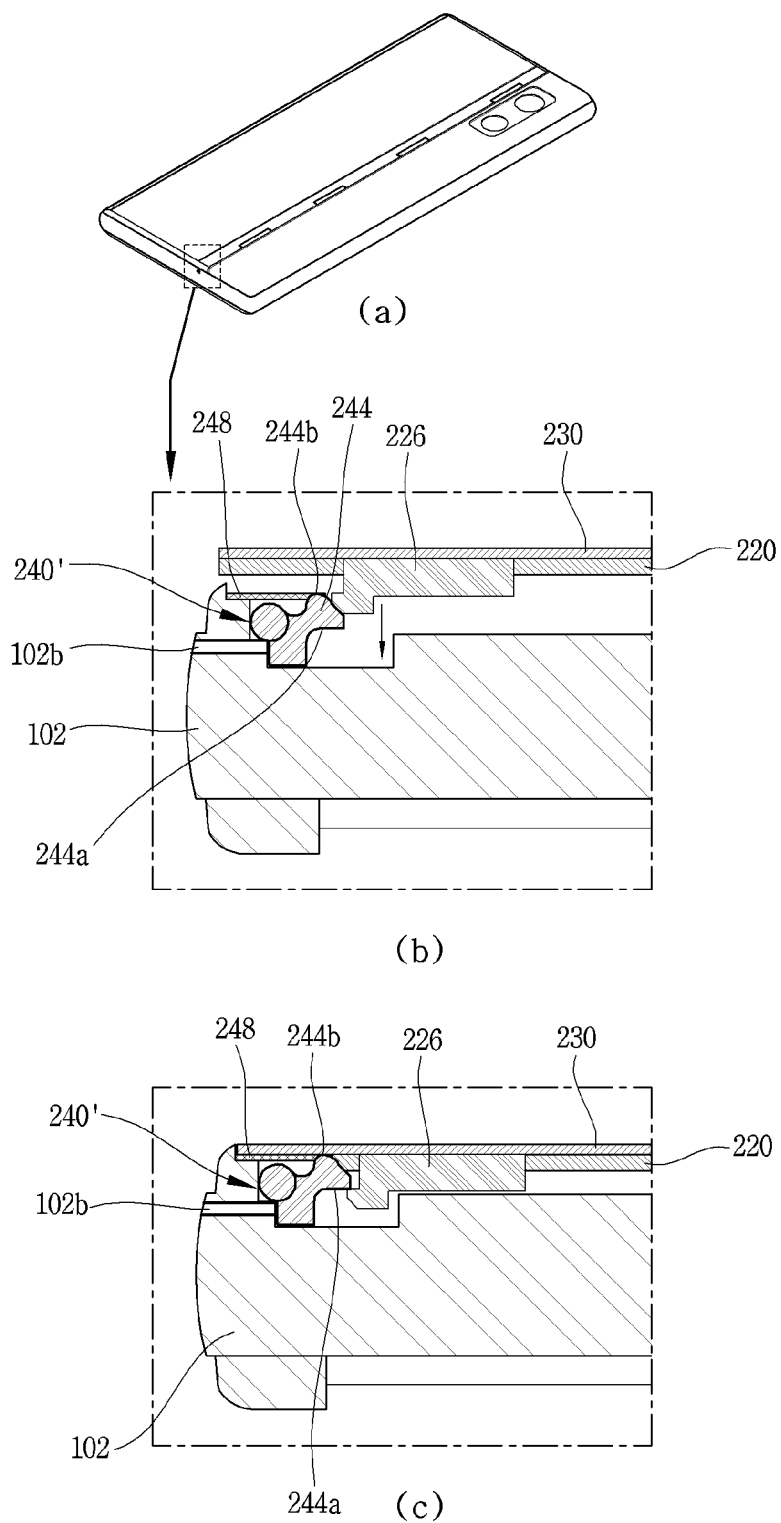

FIGS. 10A and 10B are views to describe a state in which a rear window unit of the flexible display device illustrated in FIG. 8 is being coupled to a second body.

Figure 11:
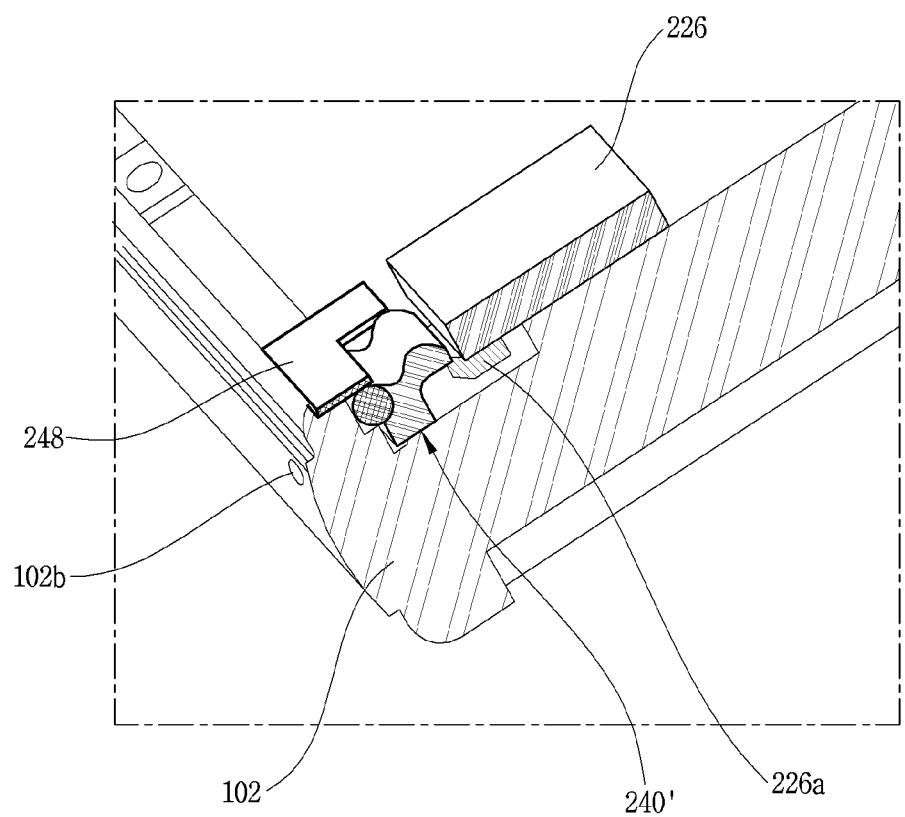

FIG. 11 is a partial cut perspective view describing (c) of FIG. 10B.

Figure 12:
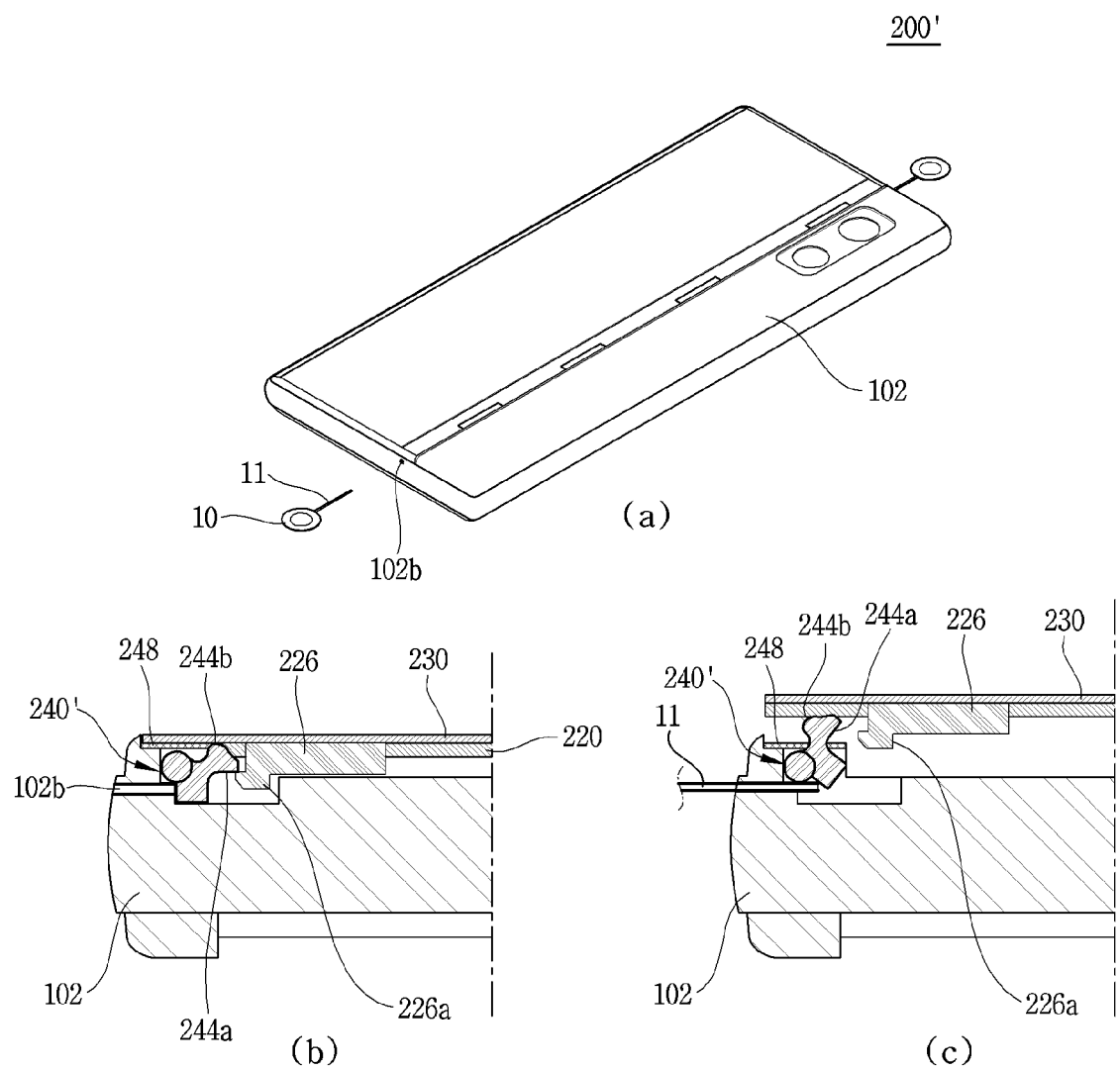

FIG. 12 is a view illustrating a state in which a rotary ejector of the flexible display device illustrated in FIG. 8 releases a rear window unit.

Figure 13A:
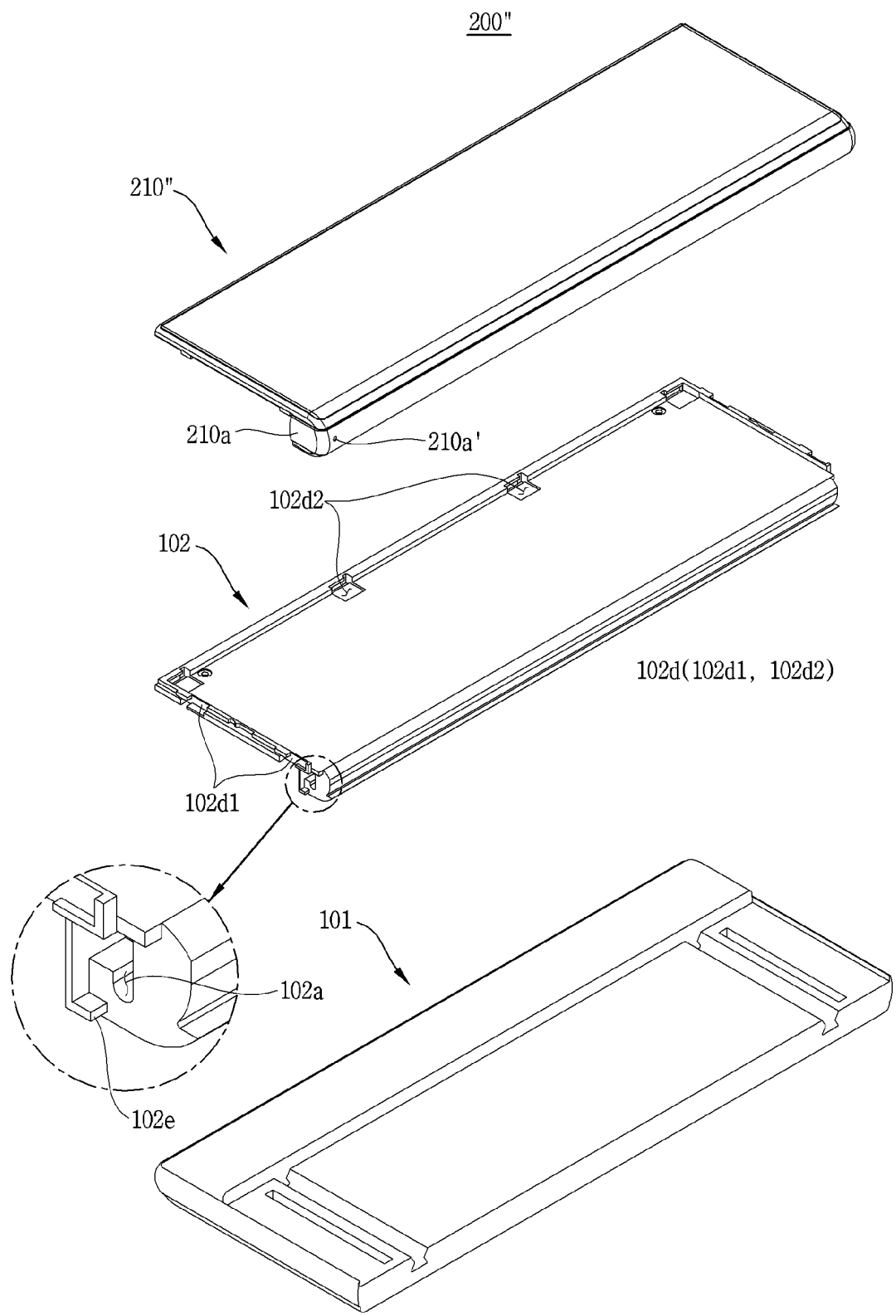

FIG. 13A is an exploded perspective view of a flexible display device according to still another embodiment of the present disclosure.

Figure 13B:
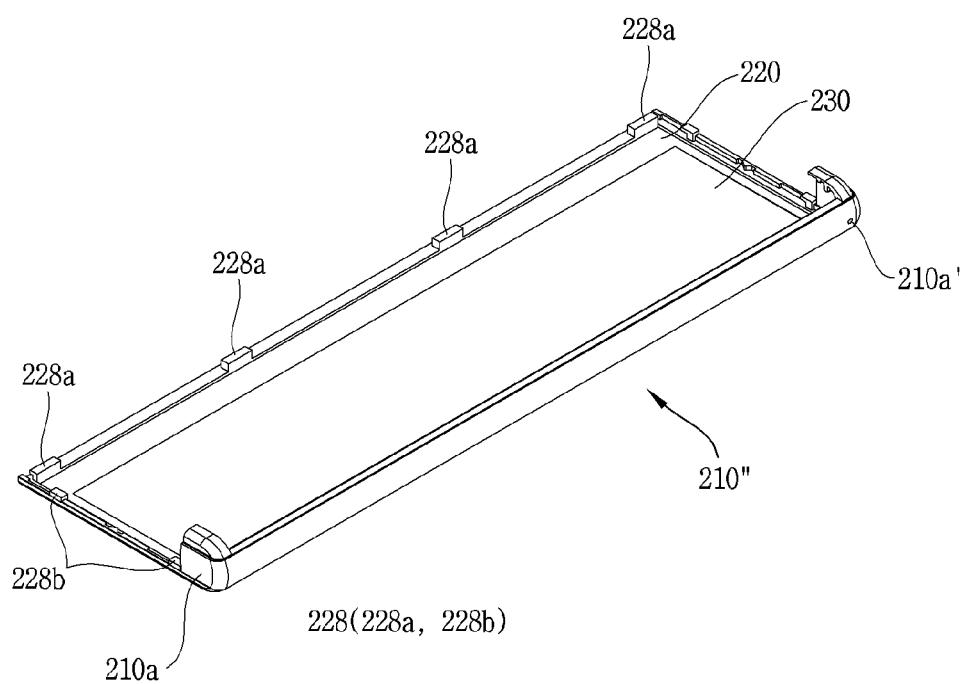

FIG. 13B is a perspective view of the rear window unit of FIG. 13A viewed from another direction.

Figure 14:
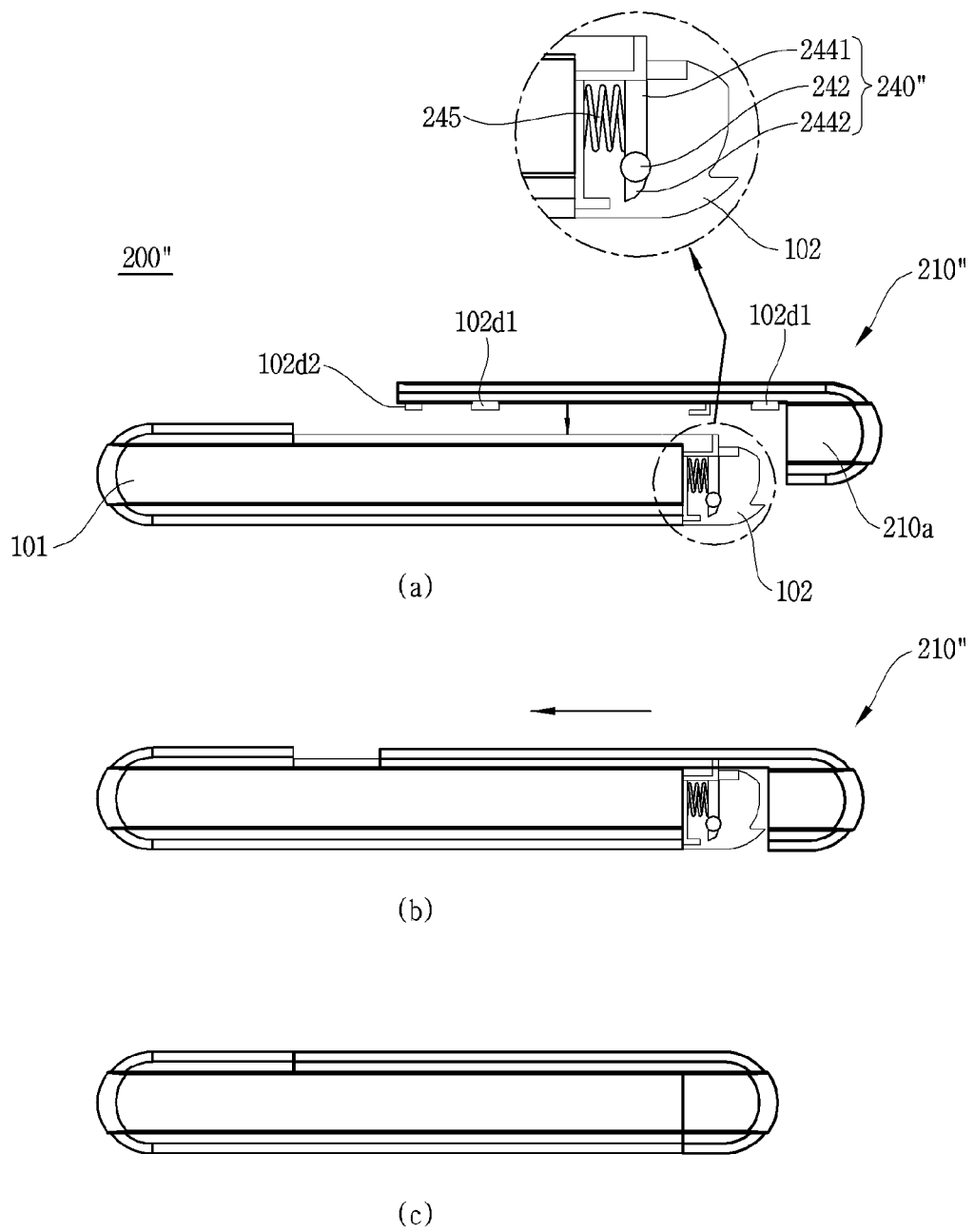

FIG. 14 is a view illustrating a process in which a rear window unit of the flexible display device of FIG. 13A is coupled to a second body.

Figure 15A:
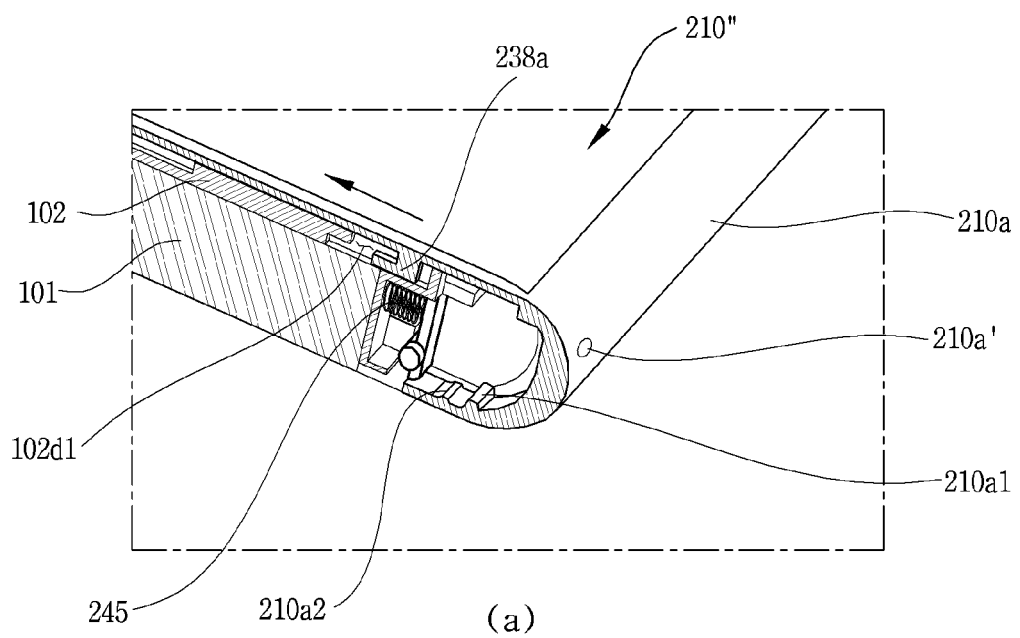
Figure 15A:
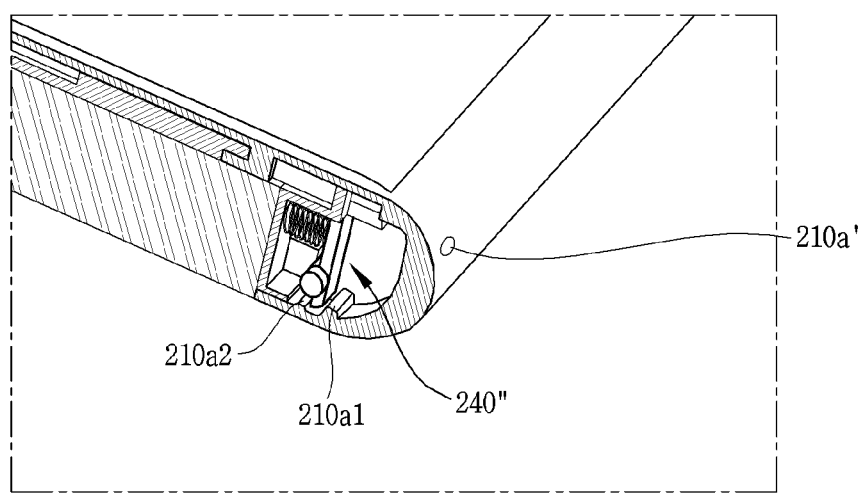
Figure 15B:
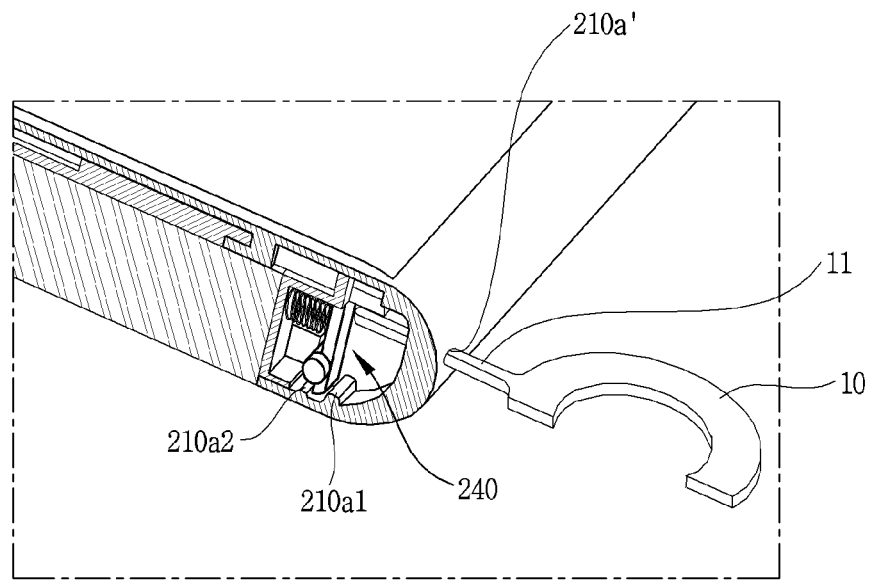
Figure 15B:
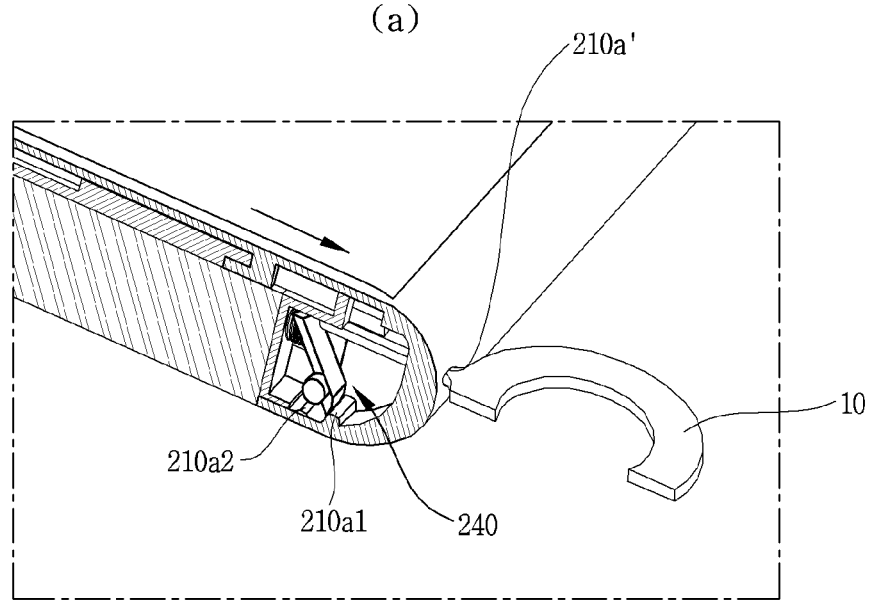

FIGS. 15A and 15B are cut perspective views illustrating processes of coupling and detaching a rear window unit of the flexible display device of FIG. 13A to and from a second body.

Figure 16:
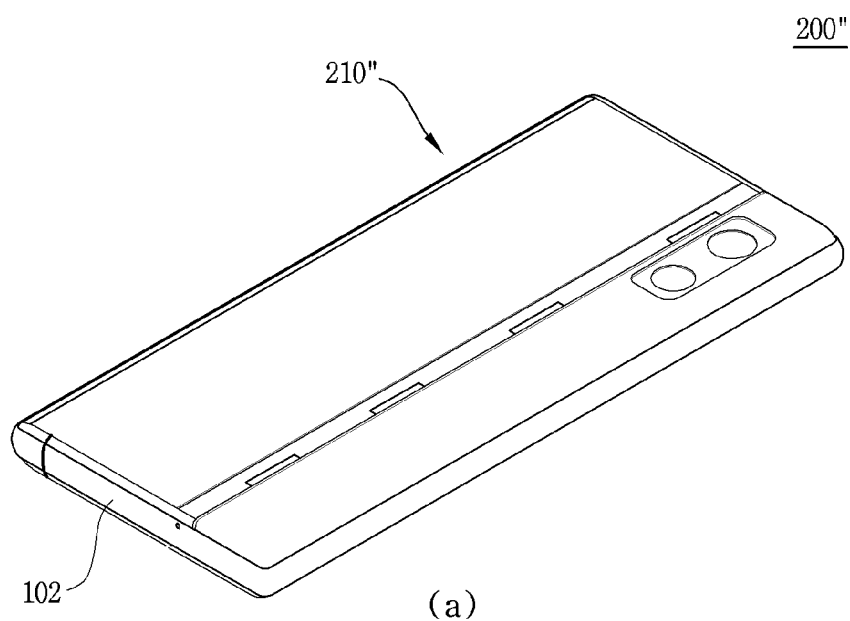
Figure 16:
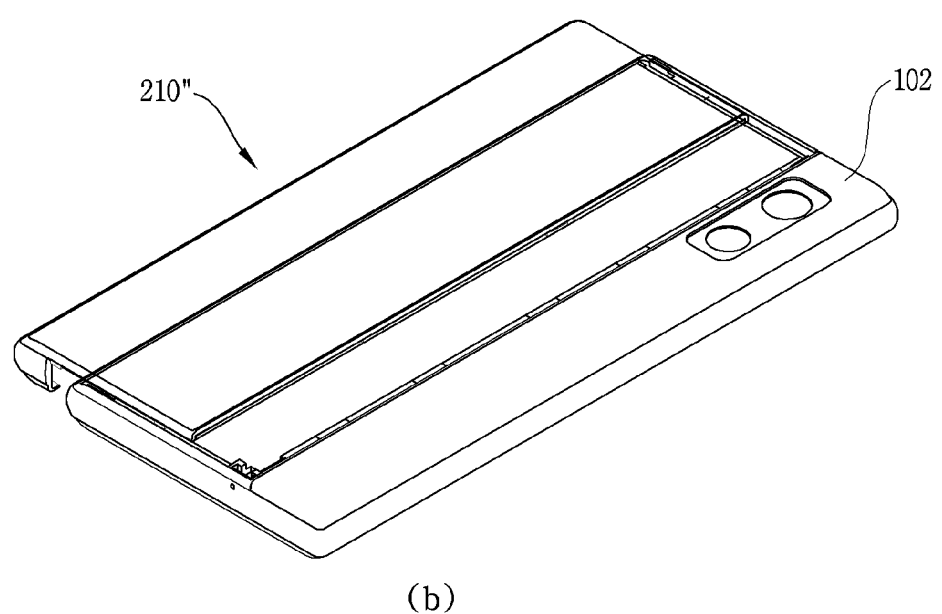

FIG. 16 is a perspective view illustrating a state in which the rear window unit of the flexible display device of FIG. 13A is coupled to and detached from a second body.

MODES FOR CARRYING OUT PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Display devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like. Hereinafter, for convenience of description, the mobile terminal will be described as one example of the flexible display device.

Figure 1:
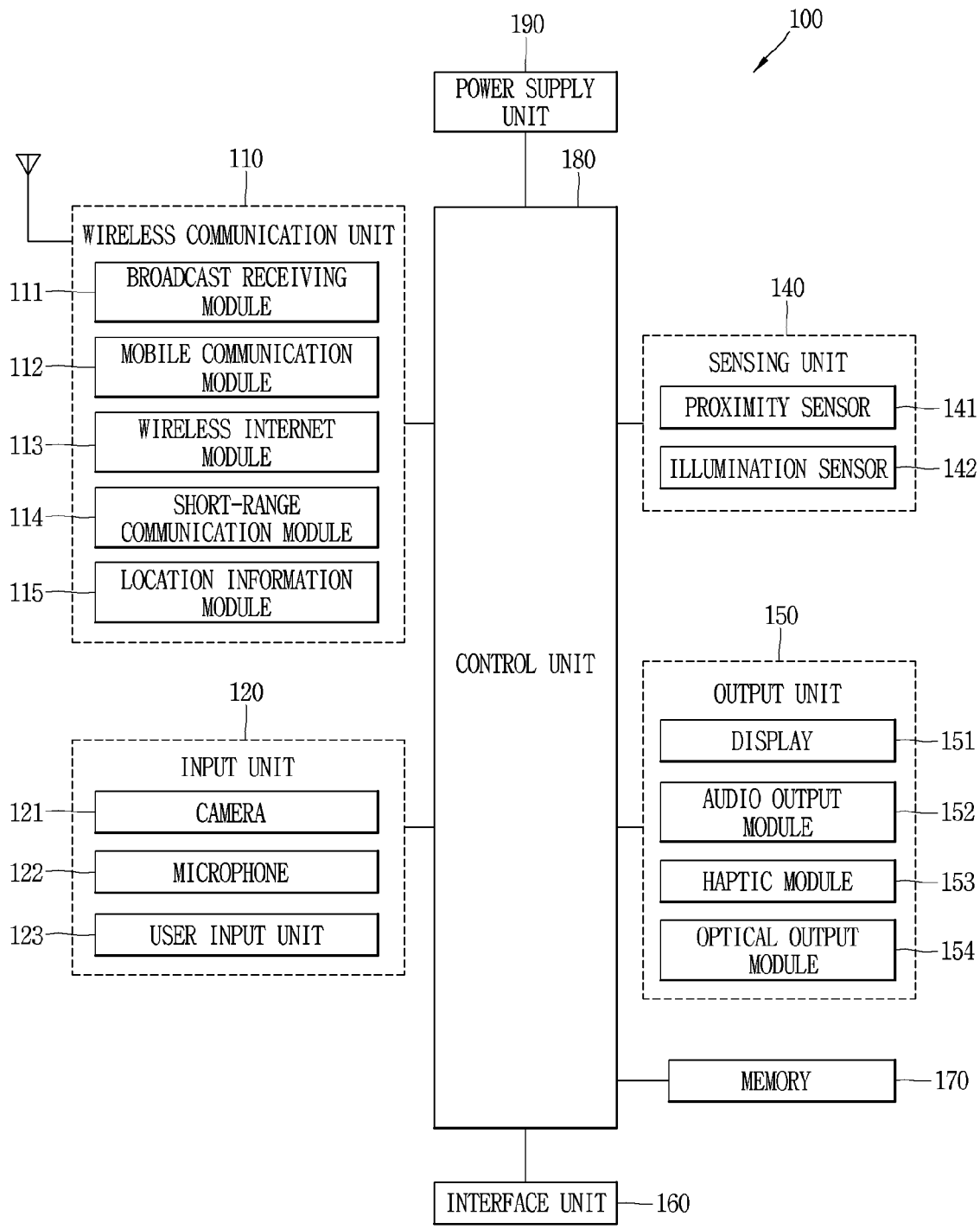
FIG. 1 is a block diagram of a mobile terminal in accordance with the present disclosure.

FIG. 1 is a block diagram of a mobile terminal in accordance with the present disclosure.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiver 111, a mobile communication module 112, a wireless Internet module 113, a short-range communication module 114, and a location information module 115.

First, regarding the wireless communication unit 110, the broadcast receiver 111 is configured to receive a broadcast signal and/or broadcast associated information from an external broadcast managing server via a broadcast channel. The broadcast channel may include a satellite channel, a terrestrial channel, or both. In some embodiments, two or more broadcast receivers may be utilized to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE) , LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function executed in the mobile terminal 100. The microphone 122 may include assorted noise removing algorithms to remove unwanted noise generated in the course of receiving the external audio signal.

The user input unit 123 is a component that receives an input of information from a user. Such user input may enable the controller 180 to control operation of the mobile terminal 100 in correspondence with the received information. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from two or more sensors of the sensing unit 140, and combinations thereof.

The proximity sensor 141 refers to a sensor to sense presence or absence of an object approaching a surface, or an object existing near a surface, by using an electromagnetic field, infrared rays, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, a signal(s) corresponding to the touch input is transmitted to a touch controller. The touch controller may process the received signals, and then transmit corresponding data to the controller 180. Accordingly, the controller 180 may sense which area of the flexible display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

In addition, the controller 180 may be a processor that drives various applications executed in the flexible display device. For example, various applications including a camera application executed in the flexible display device may be driven.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The flexible display 151 is generally configured to output information processed in the mobile terminal 100. For example, the flexible display 151 may display execution screen information of an application program executing at the mobile terminal 100 or user interface (UI) and graphic user interface (GUI) information in response to the execution screen information.

Also, the flexible display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a protrusion scheme (holographic scheme), or the like.

The output unit 150 may typically be configured to output various types of information, such as audio, video, tactile output, and the like. The output unit 150 may include at least one of the flexible display 151, an audio output module 152, a haptic module 153, and an optical output module 154. The flexible display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented such that the mobile terminal emits monochromatic light or light with a plurality of colors. The signal output may be terminated as the mobile terminal senses that a user has checked the generated event, for example.

The interface unit 160 serves as an interface with various types of external devices that are coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery 191, and the battery may be configured to be embedded in the terminal body, or configured to be detachable from the terminal body.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

(a) and (b) of FIG. 2 are perspective views illustrating an exterior appearance of a front surface of the flexible display device in a first state and in a second state, respectively. (a) and (b) of FIG. 3 are perspective views illustrating an exterior appearance of a rear surface of the flexible display device in the first state and in the second state, respectively.

The flexible display device is a device capable of varying in size of a screen due to a deformation of the flexible display, which may be understood as one of the above-described mobile terminals. In the present disclosure, the device will be referred to as a flexible display device 200.

The flexible display device 200 according to the present disclosure may include a first body 101, a second body 102, the flexible display 151, and a rear window unit 210.

The first body 101 and the second body 102 may define an exterior appearance of the flexible display device 200. The first body 101 and the second body 102 are configured to be movable relative to each other. The first body 101 and the second body 102 may achieve the first state, the second state, and a stroke state.

Specifically, the first state is an arrangement state in which the first body 101 and the second body 102 are located adjacent to each other and have a largest area of the flexible display 151 exposed to the rear surface of the second body 102. The second state is an arrangement state in which the first body 101 and the second body 102 move away from each other and have a largest area of the flexible display 151 exposed to the front surface of the first body 101. The stroke state is a state in which the first body 101 and the second body 102 are interchanged between the first state and the second state.

The flexible display device 200 in the first state has a shorter length in a first direction than in the second state. Since the flexible display device 200 in the second state is extended in the first direction, a size of the flexible display 151 disposed on the front surface of the flexible display device 200 become larger than in the first state. A direction in which the flexible display device 200 is extended is referred to as a first direction, and a direction in which the flexible display device 200 is contracted so as to be changed from the second state to the first state is referred to as a second direction. And a direction perpendicular to the first direction and the second direction is referred to as a third direction.

The flexible display device 200 of the present disclosure may be changed from the first state in which a display is disposed on a front surface such as a bar-like mobile terminal to the second state by extending the screen as illustrated in (b) of FIG. 2. In the second state, the area of the flexible display 151 located at the front surface increases, and the area of the display located at the rear surface decreases as illustrated in (b) of FIG. 3. That is, the display, which was positioned on the rear surface in the first state, is moved to the front surface in the second state.

As such, the display may use the flexible display 151 that is bendable so as for the location of the display can be changed. The flexible display 151 refers to a durable display that is lightweight and does not break easily by being fabricated on a thin, flexible substrate, such as paper, which is bent, curved, folded, twisted or rolled while maintaining characteristics of an existing flat panel display.

In addition, an electronic paper is a display to which general ink characteristics are applied, and is different from the existing flat panel display in view of using reflected light. The electronic paper may change information by using a twist ball or electrophoresis using a capsule.

In a state where the flexible display 151 is not deformed (e.g., a state having an infinite radius of curvature, hereinafter, referred to as a default state), a display area of the flexible display 151 is flat. When the default state is switched to a state where the flexible display is deformed by an external force (e.g., a state having a finite radius of curvature, hereinafter, referred to as a deformed state), the display area may be curved. As illustrated in the drawing, information displayed in the deformed state may be visual information output on a curved surface. Such visual information is realized by independently controlling an emission of unit pixels (sub-pixels) arranged in a matrix form. The unit pixel denotes an elementary unit for representing one color.

The flexible display 151 may be deformed to a curved state (e.g., curved up or down, or left or right), other than a flat state, in the default state. When an external force is applied to the curved flexible display 151, the flexible display 151 may be deformed into the flat state (or less curved state) or a more curved state.

Meanwhile, the flexible display 151 may be combined with a touch sensor to implement a flexible touch screen. When a touch is applied to the flexible touch screen, the controller 180 (see FIG. 1) may perform a control corresponding to the touch input. The flexible touch screen may be configured to sense a touch input in the deformed state as well as in the default state.

The touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

Meanwhile, the flexible display device 200 according to this varied example may be provided with a deformation detecting unit to detect a deformation of the flexible display 151. The deformation detecting unit may be included in the sensing unit 140 (see FIG. 1).

The deformation detecting unit may be provided on the flexible display 151 or on a case 105 to detect information related to the deformation of the flexible display 151. Here, the information related to the deformation may be a direction in which the flexible display 151 is deformed, a deformed degree, a deformed position, a deformed time, and an acceleration at which the deformed flexible display 151 is restored. In addition, the information may be various which is detectable as the flexible display 151 is curved.

Also, the controller 180 may change information displayed on the flexible display 151 or generate a control signal to control functions of the flexible display device 200 based on the information related to the deformation of the flexible display 151 detected by the deformation detecting unit.

A state of the flexible display 151 is not always be changed by an external force. For example, when the flexible display 151 is in the first state, the flexible display 151 may be deformed to the second state by a command of an application or a user. As such, a driving unit may be further provided to deform the flexible display without an external force.

The flexible display 151 of the present disclosure may be bent 180 degrees, so as a part of which to be located at the front surface of the flexible display device 200, and a part of which to be located in the rear surface of the flexible display device 200. Since a size of an entire area of the flexible display 151 is fixed, when the area of the flexible display 151 located on the front surface of the flexible display device 200 increases, the area of the flexible display 151 located on the rear surface of the flexible display device 200 relatively decreases.

As the flexible display 151 is disposed up to the rear surface of the flexible display device 200, in addition to the front surface of the flexible display device 200, a space where an antenna implemented in a rear case in the related art to be mounted is limited. Accordingly, the antenna may be implemented on the flexible display 151 instead of mounting the antenna in the rear case.

A display built-in antenna (AOD, Antenna on Display) is an antenna in which patterned electrode layers and dielectric layers form a transparent film. The display built-in antenna can be implemented thinner than the related art antenna implemented by copper-nickel plating laser direct structuring (LDS) technology, which has an advantage of not appearing outside and barely affecting the thickness. In addition, the display built-in antenna is able to transmit and receive a signal in a direction in which the display is located. Such a display built-in antenna may be used in a terminal having a display on both sides as in the present disclosure.

Referring to FIG. 3, the rear window unit 210 may be coupled to the second body 102. When the second body 102 is moved relative to the first body 101 so as for the first body 101 and the second body 102 to achieve the second state, the rear window unit 210 is moved together with the second body 102.

The rear window unit 210 may be mounted on the second body 102 to protect the flexible display 151 disposed on the rear surface from outside. In addition, the rear window unit 210 may be detached from the second body 102 to expose the flexible display 151. In this manner, a user may remove dust or the like introduced between the rear window unit 210 and the flexible display 151.

FIG. 4 is a cross-sectional view of the A-A and B-B of FIG. 2, and wherein the flexible display device 200 according to the present disclosure includes the first body 101, the second body 102 that slides in the first direction with respect to the first body 101, and a supporting plate 103 that slides in the first direction with respect to the second body 102. Hereinafter, a description will be given with reference to FIGS. 2 and 3.

The first body 101 and the second body 102 may include the front surface, the rear surface, and the side surface, and may define an exterior appearance of the flexible display device 200 in a hexahedral shape.

A first region 1511 disposed at one side of the flexible display 151 is fixed to the front surface of the first body 101. A third region 1513 neighboring the first region 1511 in the first direction may partially cover the front surface of the second body 102 and partially cover the rear surface of the second body 102.

A second region 1512 disposed at another side of the flexible display 151 is disposed at a rear surface of the mobile terminal. The second region 1512 is coupled to the supporting plate 103 rather than directly coupled to the second body 102. The supporting plate 103 is a plate-like member slidably coupled to the rear surface of the second body 102 in the first direction.

As illustrated in (b) of FIG. 3, a slide slot 1025 extending in the first direction is formed at the second body 102. The supporting plate 103 may move along the slide slot 1025. However, although the slide slot 1025 is illustrated as being formed at the rear surface of the second body 102 in the drawing, the slide slot 1025 may alternatively be formed at the side surface of the second body 102.

To sum up, the flexible display 151 may include the first region 1511 fixed to the first body 101, the second region 1512 fixed to the supporting plate 103, and the third region 1513 located between the first region 1511 and the second region 1512 and disposed on the front surface or the rear surface according to a state of the flexible display device 200.

The first region 1511 and the second region 1512 of the flexible display 151 maintain a default state which is flat and the curvature does not change in a process of changing between the first state and the second state of the flexible display device 200. Meanwhile, the third region 1513 is bent at another side of the second body 102 and curved to the rear surface.

When changing from the first state to the second state, an area of the third region 1513 located in the first direction of the first region 1511 is widened. A position being bent on the third region 1513 is correspondingly changed according to a sliding position of the second body 102.

Since a foldable mobile terminal or a flexible display device that unfolds like a book repeatedly bends only a specific position, a force is repeatedly applied to only one spot, causing a high risk of damage. On the other hand, the flexible display device 200 of the present disclosure can reduce a fatigue caused by a deformation that is intensively applied only to a specific spot of the flexible display 151 in the process of changing between the first state and the second state. Accordingly, the flexible display device 200 of the present disclosure can prevent damage caused by fatigue accumulation of the flexible display 151.

The first body 101 may include a first front surface 1011, a first rear surface 1012, and a second rear surface 1013. The first front surface 1011 is coupled to the first region 1511 of the flexible display 151. The first rear surface 1012 is exposed from the rear surface of the first body 101 to an outer side in the first state as illustrated in (a) of FIG. 3. As illustrated in (b) of FIG. 3, the second rear surface 1013 is covered by the second and third regions of the flexible display in the first state, and is exposed to the outside in the second state.

Since the first rear surface 1012 is always exposed to the outside, the camera 121, a flash, the proximity sensor 141, and the like may be disposed on the first rear surface 1012.

Since a typical bar-like terminal has a display on only one side thereof, cameras are required on both a rear surface and a front surface of the terminal to capture an image of an object located at an opposite side of a user or an image of the user him/herself. However, since the flexible display 151 is also located on the rear surface of the flexible display device 200 of the present disclosure, capturing an image of an object located at an opposite side of a user or an image of the user him/herself is possible by using one camera.

In detail, since the display is visually disposed on both the front surface and the rear surface of the flexible display device 200, a user can take a picture while viewing the front surface of the flexible display device 200. In addition, the user may take a picture with the camera facing the user while viewing the rear surface of the flexible display device 200.

The camera 121 may include a plurality of cameras having different angles of view, such as wide angle, ultra-wide angle, and telephoto. In addition to the camera 121, the proximity sensor 141, an audio output module, and the like may be provided. An antenna 116 may be implemented on the first rear surface 1012.

The first body 101 may include a side surface 1014 surrounding a circumference of the flexible display device 200. The first body 101 covers side surfaces of both sides of the third direction and a side surface of one side of the first direction except for an end portion of the first direction where the second body 102 is inserted into and drawn out. An interface unit to connect a power port or an ear jack or a user input unit such as a volume button may be disposed on the side surface 1014. In a case of including a metal material, the side surface may serve as an antenna.

The second body 102 may include a second front surface 1021, a third rear surface 1022, and a side frame 210a.

The second front surface 1021 is disposed on a rear surface of a first front surface 1011 of the first body 101. When the flexible display device 200 changes from the first state to the second state, the second front surface 1021 supports a rear surface of the flexible display 151, here, a front surface of the flexible display 151 is extended. That is, the second front surface 1021 supports the third region 1513 disposed on the front surface of the flexible display 151 in the second state.

The third rear surface 1022 covers a rear surface of the second rear surface 1013 of the first body 101. The above-described slide slot 1025 may be formed on the third rear surface 1022. The third rear surface 1022 is not exposed to the outside in the first state of the flexible display device 200, but may be exposed to the outside when the flexible display device 200 is changed to the second state.

A user input may be performed on a side surface of the flexible display device 200 by using a touch sensor of the flexible display 151. The side frame 210a may partially include a conductive material for touch input. A protrusion may be provided on a portion including the conductive material so that a user may touch the protrusion to input a user command.

A cylindrical roller 1028 may be provided at an end portion of the second body 102 in the first direction so that the third region 1513 of the flexible display 151 is wound around the roller 1028 and the wound part may be gently curved with a predetermined curvature.

The roller 1028 is positioned at the end portion of the second body 102 in the first direction, brought into contact with an inner surface of the flexible display 151, and rotated when the flexible display 151 moves so that the flexible display 151 slides smoothly from the rear surface to the front surface or vice versa when the second body 102 slides.

Since the flexible display 151 wound on the roller 1028 is located at an end portion of the flexible display device 200 in the first direction, the flexible display device 200 may be broken when an impact such as dropping the flexible display device 200 is applied thereto. To prevent a breakage, the second body 102 may further include the side frame 210a to protect the flexible display 151 wound on the roller 1028 as illustrated in FIG. 2.

The side frame 210a may prevent a breakage problem that occurs when a bent surface of the flexible display 151 in an out-folding manner is exposed to the outside, thereby improving durability of the flexible display device 200.

The side frame 210a surrounds a curved end portion of the flexible display 151 at another side of the flexible display device 200 to protect the flexible display 151 wound on the roller 1028. The side frame 210a may include an opaque material or a transparent material, or may be configured by mixing an opaque material and a transparent material. A user may view an image or a text output from the flexible display 151 through a transparent portion.

Meanwhile, a gap G through which the flexible display 151 is moved is required between the flexible display 151 and the side frame 210a disposed on the front surface of the first body 101. In detail, a small gap may exist between the side frame 210a and the flexible display 151 in order for the flexible display 151 to be changed between the first state and the second state. Dust and foreign substances 2 may be introduced into the gap between the side frame 210a and the flexible display 151. In addition, the dust and foreign substances introduced into the gap between the side frame 210a and the flexible display 151 may also be introduced into an inner side of the rear window unit 210. However, since the rear window unit 210 of the present disclosure is detachable from the second body 102, dust and foreign substances introduced between the side frame 210a and the flexible display 151 may be removed.

FIG. 5 is an exploded perspective view of a flexible display device according to an embodiment of the present disclosure. FIG. 6A is a perspective view and FIG. 6B is a cut perspective view illustrating a state in which the flexible display device illustrated in FIG. 5 is being coupled. FIG. 7 is a view to describe a rotary ejector of the flexible display device illustrated in FIG. 5.

A flexible display device 200 according to an embodiment of the present disclosure may include a first body 101, a second body 102, a flexible display 151, and a rear window unit 210. As described above, the first body 101 and the second body 102 are configured to be movable relative to each other.

The flexible display 151 is configured to be exposed to a front surface of a first body 101 and to a rear surface of a second body 102, and may change in size of areas exposed to the front surface of the first body 101 and to the rear surface of the second body 102 as the first body 101 and the second body 102 are relatively moved.

The rear window unit 210 may be detachably coupled to the rear surface of the second body 102. The rear window unit 210 is configured to cover the flexible display 151 exposed to the rear surface of the second body 102. The rear window unit 210 may include a frame 220 and a rear window 230.

The frame 220 is detachably coupled to the rear surface of the second body 102. The frame 220 may form a rectangular edge. In detail, the frame 220 may form a rectangular edge covering the flexible display 151 exposed on the rear surface of the second body 102 in the first state.

The frame 220 may be made of a stainless steel (SUS, Steel Use Stainless) material to which magnetic force is applied. In detail, the frame 220 may be made of a stainless material such as ferritic and martensitic steels on which magnetic force acts. Therefore, the frame 220 may be coupled with a magnet 250 to be described later.

The rear window 230 is coupled to the frame 220 and covers the flexible display 151 exposed to the rear surface of the second body 102 in the first state. That is, the rear window unit 210 may cover the entire flexible display 151 exposed to the rear surface of the second body 102 when an area of the flexible display 151 exposed to the rear surface of the second body 102 is maximum.

A plurality of magnets 250 may be disposed in the second body 102. The magnets 250 may be spaced apart from each other along an area corresponding to an area in contact with the frame 220 of the rear window unit 210. In addition, as illustrated in the drawing, a sub-frame 205 may be further provided on the second body 102 corresponding to a surface where the second body 102 is brought into contact the rear window unit 210. The sub-frame 205 may protect the surface of the second body 102 in a repeated coupling and detaching process of the second body 102 and the rear window unit 210. However, the sub-frame 205 may not be provided for reasons of design.

The magnets 250 may be coupled to the frame 220 by magnetic force when the magnets 250 are brought into contact with the frame 220. Specifically, as illustrated in FIGS. 5 and 6B, magnetic force acts on the frame 220 as the frame 220 is brought into contact with the magnets 250 disposed on the second body 102. The rear window unit 210 and the second body 102 may be coupled by the magnetic force. This coupling force acts in a direction from the rear surface of the second body 102 toward the rear window 230. This may be referred to as a bonding force in a perpendicular direction. That is, the magnets 250 may provide the coupling force in the perpendicular direction with respect to the frame 220.

The frame 220 may include a protrusion 222 bent and protruded in a direction toward the second body 102 at a corner of the frame 220. Specifically, as illustrated in FIGS. 5 and 6A, a part adjacent to each corner of the frame 220 may have a protrusion 222 bent and protruded in the direction toward the second body 102. The protrusion 222 is coupled to a fixing clip 260 to be described later. Accordingly, the rear window unit 210 and the second body 102 may be coupled to each other.

The second body 102 may include a fixing clip 260 disposed at a position corresponding to the protrusion 222 into which at least a part of the protrusion 222 is inserted and fixed. In detail, as illustrated in FIG. 5, the fixing clip 260 may be disposed at each corner of a region corresponding to the rear window unit 210 of the second body 102.

The fixing clip 260 has an S shape and two or more clips 262 in which protruding parts thereof facing each other are provided. The protrusion 222 may be inserted into and coupled to an opening 261 between the protruded parts of the clip 262. The coupling between the protrusion 222 of the frame 220 and the fixing clip 260 of the second body 102 also acts in the direction from the rear surface of the second body 102 toward the rear window 230. It can be defined as a vertical coupling force.

The second body 102 may include a rotary ejector 240. The rotary ejector 240 is disposed inside the second body 102. The rotary ejector 240 is pressed and rotated by an ejector pin 11 of an ejector 10. Accordingly, the rotary ejector 240 presses the frame 220 or the rear window 230. And subsequently, the rear window unit 210 is separated from the second body 102.

Referring to FIG. 7, the rotary ejector 240 may include a rotation shaft 242 and a hook 244.

The rotation shaft 242 is inserted into the second body 102. As illustrated in FIG. 5, the rotation shaft 242 may be inserted into a rotary groove 102a of the second body 102. As the rotation shaft 242 is inserted into the rotary groove 102a, the rotation shaft 242 may not move except a case that the rotary ejector 240 is separated from the second body 102 or rotated. Meanwhile, as an upper portion of the rotary groove 102a is opened and pressed by the ejector pin 11, the rotary ejector 240 may be moved upward. In order to prevent this, a fixing plate 248 to press an upper side of the rotary ejector 240 may be provided.

The hook 244 protrudes from the rotation shaft 242 in a direction forming an angle with a lengthwise direction of the rotation shaft 242. In detail, the hook 244 may protrude from the rotation shaft 242 toward a lower portion of the rear window unit 210 and an inner side of the second body 102. The hook 244 may press the frame 220 or the rear window 230 as the rotation shaft 242 is rotated. Accordingly, the rear window unit 210 may be separated from the second body 102.

The flexible display device 200 according to an embodiment of the present disclosure may provide a coupling force in a perpendicular direction between the rear window unit 210 and the second body 102 by the protrusion 222, the fixing clip 260, the magnet 250, and the frame 220. With such a configuration, the rear window unit 210 and the second body 102 are coupled to each other.

In addition, the flexible display device 200 according to an embodiment of the present disclosure may release the perpendicular coupling force between the protrusion 222 and the fixing clip 260 and between the magnet 250 and the frame 220 to separate the rear window unit 210 from the second body 102 by the rotary ejector 240 rotated as the ejector pin 11 is inserted.

By separating the rear window unit 210 from the second body 102, a user can remove dust or foreign substances that may be introduced into the flexible display 151 disposed on the rear surface of the second body 102. Therefore, the flexible display 151 disposed on the rear surface of the second body 102 may be more easily protected or managed.

FIG. 8 is an exploded perspective view of a flexible display device according to another embodiment of the present disclosure. FIG. 9 is a view to describe a part in which a second body and a rear window unit of the flexible display device illustrated in FIG. 8 are coupled. FIGS. 10A and 10B are views to describe a state in which the rear window unit of the flexible display device illustrated in FIG. 8 is being coupled to the second body. FIG. 11 is a partial cut perspective view to describe (c) of FIG. 10B. And, FIG. 12 is a view illustrating a state in which a rotary ejector of the flexible display device illustrated in FIG. 8 releases the rear window unit.

A flexible display device 200' according to an embodiment of the present disclosure further includes an outside hook 224 and an inside hook 226 when compared to the flexible display device 200 described with reference to FIGS. 5 to 7. Since there is a difference only in a specific configuration of a rotary ejector 240' and other configurations are same or similar, descriptions of the other configurations will be omitted.

A plurality of magnets 250 may be disposed in a second body 102 of the flexible display device 200'. The magnets 250 may be spaced apart from each other along an area corresponding to an area in contact with a frame 220 of a rear window unit 210'.

A concave portion 210b which is recessed upward by a thickness of the magnet 250 may be formed at an area corresponding to the magnet 250 in the rear window unit 210'. The concave portion 210b may provide a space into which the magnet 250 may be inserted. Accordingly, there is no gap between the rear window unit 210' and the second body 102, the rear window unit 210' may be closely coupled to the second body 102. Meanwhile, unlike illustrated in the drawing, an area on which the magnet 250 is disposed in the second body 102 may be recessed inward by the thickness of the magnet 250. Accordingly, the rear window unit 210' may not include the concave portion 210b.

The frame 220 of the flexible display device 200' according to an embodiment of the present disclosure may include the outside hook 224.

The outside hook 224 may be disposed on one surface of an edge of the frame 220. The outside hook 224 may extend in a lengthwise direction of the edge. In detail, the outside hook 224 may be disposed on an area of the frame 220 corresponding to an outer edge of the second body 102.

An outside hook groove 102c into which the outside hook 224 is inserted may be formed at the second body 102. The outside hook groove 102c may be formed such that the outside hook 224 is inserted thereinto in a diagonal direction.

Referring to FIG. 10A, the outside hook 224 is inserted into the outside hook groove 102c in a diagonal direction. The outside hook 224 may further include an outside hook protrusion 224a that protrudes outward for the insertion in the diagonal direction. In addition, a width and a depth of an inlet of the outside hook groove 102c may be adjusted so that the outside hook 224 can be stably inserted into the outside hook groove 102c in the diagonal direction.

Referring to the drawing, the frame 220 may further include an inside hook 226. The inside hook 226 may be disposed on an opposite side of the above-described one surface of the edge of the frame 220. That is, the inside hook 226 may be disposed on a surface of the frame 220 opposite to a surface on which the outside hook 224 is disposed. The inside hook 226 protrudes from the frame 220 toward the second body 102. Specifically, the inside hook 226 is disposed on the frame 220 to protrude toward the second body 102 from the surface of the frame 220.

The inside hook 226 may be fixedly provided by the above-described rotary ejector 240'. Specifically, referring to FIG. 10B, a hook 244 of the rotary ejector 240' may include a first surface 244a supporting an upper surface of at least a part of the inside hook 226 and a second surface 244b that is provided upwardly with respect to the first surface 244a, disposed adjacent to the frame 220 or the rear window 230, and convex upward.

Subsequently, referring to FIG. (c) of 10B and FIG. 11, the first surface 244a of the hook 244 of the rotary ejector 240' supports the upper surface of the inside hook 226, and the second surface 244b is disposed adjacent to the frame 220 in a state where the rear window unit 210' is coupled to the second body 102.

The inside hook 226 may further include a protrusion 226a protruding toward a lower portion of the first surface 244a of the rotary ejector hook 244 so as to be disposed and fixed to the lower portion of the first surface 244a of the rotary ejector hook 244. As the first surface 244a of the rotary ejector hook 244 supports an upper portion of the protrusion 226a of the inside hook 226, the rotary ejector 240' may provide a perpendicular coupling force by which the rear window unit 210' can be stably coupled to the second body 102.

As an ejector pin 11 is inserted into an ejector pin insertion hole 102b, the hook 244 of the rotary ejector 240' may be pressed and rotated by the ejector pin 11. Here, a fixing plate 248 may be provided to fix the rotary ejector 240' at an upper side so that the rotary ejector 240' does not move upward while the rotary ejector 240' is rotating.

As the rotary ejector 240' is rotated, the first surface 244a of the hook 244 may release the upper surface of the inside hook 226, and the second surface 244b may press the frame 220 or the rear window 230.

In detail, referring to FIG. 12, as the ejector pin 11 is inserted, the rotary ejector 240' rotates such that the first surface 244a of the rotary ejector 240' may release the upper surface of the inside hook 226. In addition, the second surface 244b of the rotary ejector 240' may press the frame 220 in a direction away from the second body 102. Accordingly, the rear window unit 210' may be separated from the second body 102.

The inside hook 226 may be brought into contact with the lower portion of the hook 244 of the rotary ejector 240' as the frame 220 moves toward the second body 102 after the outside hook 224 is inserted into the outside hook groove 102c.

Specifically, referring to FIG. 10A, in order for the rear window unit 210' to be coupled to the rear surface of the second body 102, firstly, the outside hook 224 of the rear window unit 210' may be coupled to the outside hook groove 102c of the second body 102. Thereafter, the inside hook 226 of the rear window unit 210' may be moved toward the rotary ejector 240' of the second body 102.

Referring to (b) of FIG. 10B, the inside hook 226 is disposed on an upper portion of the rotary ejector 240' of the second body 102. Here, when a user applies an external force, as illustrated in (c) of FIG. 10B, the rotary ejector 240' may be pushed back by an elastic force of the material, and a part of the inside hook 226 may be press-fitted. Through this process, the rear window unit 210' may be stably coupled to the second body 102.

As described above, the second body 102 of the flexible display device 200' may be coupled to the rear window unit 210' at three places. Referring to FIG. 9, the outside hook 244 and the outside hook groove 102c are coupled in a region A, the magnet 250 and the frame 220 are coupled in a region B, and the rotary ejector 240' and the inside hook 226 are coupled in a region C. Accordingly, the rear window unit 210' of the flexible display device 200' according to an embodiment of the present disclosure can be stably coupled with the second body 102.

Meanwhile, the flexible display device 200' may further include a prevention pad 270 disposed to cover a gap between a flexible display 151 and the second body 102. Specifically, referring to FIG. 9, the prevention pad 270 may be disposed between the flexible display 151 and the second body 102 to prevent foreign substances from entering the gap between the flexible display 151 and the second body 102. Such a prevention pad 270 may also be included in the flexible display device illustrated in FIGS. 5 and 13A.

When the rear window unit 210' is separated from the second body 102, the flexible display 151 disposed on the rear surface of the second body 102 may be exposed to the outside. Accordingly, a user may remove foreign substances and the like from the flexible display 151 disposed on the rear surface of the exposed second body 102.

In the flexible display device 200' according to an embodiment of the present disclosure, the outside hook 224 is firstly fastened to the second body 102 in a diagonal direction, then the inside hook 226 is fastened by the rotated ejector 240', and this may result in improving an easiness of the fastening. That is, by fastening the outside hook 224 firstly in the diagonal direction and then fastening the inside hook 226, the easiness of the fastening in an order and a method may be improved.

In addition, the flexible display device 200' may firstly detach the inside hook 226 from the second body 102 by the ejector pin 11. Here, since the outside hook 224 is fastened to the second body 102, the rear window unit 210' may be spaced apart from the second body 102 in a state only the inside hook 226 side is separated without the outside hook 224 side being completely separated from the second body 102. Accordingly, a user can grip and pull the spaced inside hook 226 side to separate the rear window unit 210' from the second body 102 more easily and safely.

FIG. 13A is an exploded perspective view of a flexible display device according to still another embodiment of the present disclosure. FIG. 13B is a perspective view of a rear window unit of FIG. 13A viewed from another direction. FIG. 14 is a view illustrating a process in which the rear window unit of the flexible display device of FIG. 13A is coupled to a second body. FIGS. 15A and 15B are cut perspective views illustrating processes of coupling and detaching the rear window unit of the flexible display device of FIG. 13A to and from the second body. FIG. 16 is a perspective view illustrating a state in which the rear window unit of the flexible display device of FIG. 13A is coupled to and detached from the second body.

Meanwhile, when compared to the flexible display device 200 described with reference to FIGS. 5 to 7, a flexible display device 200" according to an embodiment of the present disclosure has a difference only in a specific configuration of a side frame 210*a*, a slide hook 228, and a rotary ejector 240" and other configurations are same or similar, descriptions of the other configurations will be omitted.

In the flexible display device 200" according to an embodiment of the present disclosure, a second body 102 is coupled to a rear surface of a first body 101, and a rear window unit 210" is coupled to a rear surface of the second body 102.

A frame 220 of the flexible display device 200" may further include the side frame 210*a* extending from a rectangular edge. The side frame 210*a* may be provided to surround one side surface of the second body 102. Specifically, referring to FIGS. 13A, 13B, and 14, the frame 220 may include the side frame 210*a* extending from the rectangular edge.

The side frame 210*a* may include features as described in the above-described embodiment. For example, the side frame 210*a* may include a conductive material. The side frame 210*a* may have a protrusion to input a user's command by touching of the protrusion.

Referring to FIGS. 13A and 13B, the frame 220 may include the slide hook 228 that protrudes and bent toward the second body 102. The slide hook 228 may include a first slide hook 228*a* disposed along a lengthwise direction and a second slide hook 228*b* disposed at an end portion in a widthwise direction.

In addition, a slide hook insertion groove 102*d* into which the slide hook 228 is inserted may be formed at the second body 102. The slide hook insertion groove 102*d* may include a first groove 102*d*1 into which the first slide hook 228*a* is inserted and a second groove 102*d*2 into which the second slide hook 228*b* is inserted.

The frame 220 may be coupled to the second body 102 as the slide hook 228 is inserted into the slide hook insertion groove 102*d* in one direction (vertical direction) and then slid in a direction perpendicular to the inserted direction. Here, the direction perpendicular to the inserted direction is a direction in which an area where the rear window unit 210" overlaps the second body 102 is widened.

As the frame 220 slides, the slide hook 228 of the frame 220 is coupled to the slide hook insertion groove 102*d* of the second body 102. The slide hook insertion groove 102*d* extends along the second body 102 in the above-described second direction (the direction opposite to the first direction). Therefore, the slide hook 228 inserted into the slide hook insertion groove 102*d* may slide and move along the direction in which the slide hook insertion groove 102*d* extends. The moved slide hook 228 may be fixed to the slide hook insertion groove 102*d*.

The rotary ejector 240" may be disposed in one side of the second body 102. As illustrated in FIGS. 15A and 15B, the rotary ejector 240" may rotate as an ejector pin 11 is pressed. The rotary ejector 240" may press the frame 220 in a direction opposite to a pressing direction of the ejector pin 11.

As illustrated in FIGS. 14 and 15A, the rotary ejector 240" may include a first hook 2441 and a second hook 2442. The first hook 2441 protrudes in one direction from a rotation shaft 242 and is pressed by the ejector pin 11. The second hook 2442 protrudes from the rotation shaft 242 in a direction opposite to the one direction and presses the frame 220.

The second body 102 may further include an elastic body 245 to press the first hook 2441 toward the side frame 210*a*. The rotation shaft 242 of the rotary ejector 240" may be inserted into a rotary groove 102*a* into which the rotation shaft 242 of the second body 102 is inserted. Accordingly, the rotary ejector 240" may be fixed to the second body 102. Here, the elastic body 245 presses the first hook 2441, so that the rotary ejector 240" rotates centering on the rotation shaft 242. In addition, the second hook 2442 may be locked to a support 102*e* of the second body 102 so that the rotary ejector 240" is not rotated.

Hereinafter, a process of coupling the rear window unit 210" to the second body 102 will be described with reference to FIGS. 14 and 15A.

As illustrated in (a) of FIG. 14, the first slide hook 228*a* of the rotary ejector 240" may be inserted into the first groove 102*d*1. Thereafter, referring to (b) of FIG. 14 and (a)

of FIG. 15A, the first slide hook 228a inserted along the first groove 102d1 may slide in the second direction. Accordingly, the rear window unit 210" may be coupled to the second body 102 as illustrated in (c) of FIG. 14, (b) of FIG. 15B, and (a) of FIG. 16.

Meanwhile, a supporting portion 210a2 and a protruding portion 210a1 may be provided in the side frame 210a of the rear window unit 210". The supporting portion 210a2 and the protruding portion 210a1 are spaced apart from each other on a position where the second hook 2442 of the rotary ejector 240" is disposed when the rear window unit 210" and the second body 102 are coupled to each other. Specifically, referring to (b) of FIG. 15A, the second hook 2442 of the rotary ejector 240" is disposed between the supporting portion 210a2 and the protruding portion 210a1.

When the first hook 2441 of the rotary ejector 240" is pressed by the elastic body 245, the first hook 2441 rotates centering on the rotation shaft 242. And, as described above, the second hook 2442 of the rotary ejector 240" may be supported by the support of the second body 102 before the second hook 2442 is coupled with the rear window unit 210". The second hook 2442 of the rotary ejector 240" may be supported by the supporting portion 210a2 of the side frame 210a after being coupled with the rear window unit 210".

Hereinafter, a process of separating the rear window unit 210" from the second body 102 will be described.

Referring to (a) and (b) of FIG. 15B, an insertion hole 210a' into which the ejector pin 11 is inserted is formed in the side frame 210a. The side frame 210a may include the protruding portion 210a1 that is pressed by the second hook 2442 as the second hook 2442 is rotated.

Referring to FIG. 15B, the ejector pin 11 may be inserted through the insertion hole 210a' formed in the side frame 210a. The ejector pin 11 may be inserted toward an inner side of the side frame 210a from an outer side of the side frame 210a. The ejector pin 11 presses the first hook 2441 of the rotary ejector 240". As the first hook 2441 is pressed, the second hook 2442 disposed in an opposite direction about the rotation shaft 242 may press the protruding portion 210a1 of the side frame 210a. Accordingly, the side frame 210a and the rear window unit 210" may be separated from the second body 102 as illustrated in (b) of FIG. 16. Here, a direction in which the rotary ejector 240" presses the frame 220 is opposite to a direction in which the frame 220 is inserted into the insertion groove and slides to be fixed.

In the flexible display device 200" according to an embodiment of the present disclosure, since the frame 220 of the rear window unit 210" is integrally formed with the side frame 210a, the flexible display 151 disposed on a side surface of the second body 102 is also exposed when the rear window unit 210" is separated from the second body 102. Accordingly, foreign substances introduced into the flexible display 151 that is disposed on the side surface of the second body 102 can be removed.

In addition, since the rear window unit 210" includes the side frame 210a, a user may couple and detach the rear window unit 210" by gripping the side frame 210a. Therefore, the process of coupling and detaching the rear window unit 210" to and from the second body 102 may be proceeded more stably.

Furthermore, in the flexible display device 200" according to an embodiment of the present disclosure, as the rotary ejector 240" is disposed adjacent to the side frame 210a, the rear window unit 210" can be coupled to or detached from the second body 102 in a sliding manner not in a vertical manner.

The aforementioned flexible display device is not limited to the configurations and the methods of the embodiments described above, but all or some of the embodiments may be selectively combined so that various modifications can be made.

The invention claimed is:

1. A flexible display device comprising:
   a first body;
   a second body configured to be movable relative to the first body;
   a flexible display disposed on a front surface of the first body and a rear surface of the second body, and configured such that a size of an area exposed to the front surface of the first body and a size of an area exposed to the rear surface of the second body vary as the first body and the second body are moved relative to each other; and
   a rear window unit detachably coupled to the rear surface of the second body, and configured to cover the area of the flexible display exposed to the rear surface of the second body,
   wherein the first body and the second body are movable to be in one of:
   a first state of being located adjacent to each other such that the area of the flexible display exposed to the rear surface of the second body is largest;
   a second state of being moved away from each other such that the area of the flexible display exposed to the front surface of the first body is largest; or
   a stroke state in which the first state and the second state are interchanged with each other.

2. The flexible display device of claim 1, wherein the rear window unit comprises:
   a frame detachably coupled to the rear surface of the second body; and
   a rear window coupled to the frame and configured to cover the area of the flexible display exposed to the rear surface of the second body when the first body and the second body are in the first state.

3. The flexible display device of claim 2, wherein the second body comprises:
   a rotary ejector configured to press the frame or the rear window as the rotary ejector is rotated so that the rear window unit is separated from the second body.

4. The flexible display device of claim 3, wherein the rotary ejector comprises:
   a rotation shaft inserted into the second body; and
   a hook protruding from the rotation shaft in a direction forming an angle with a lengthwise direction of the rotation shaft so as to press the frame or the rear window as the rotation shaft is rotated.

5. The flexible display device of claim 4, wherein the frame forms a rectangular edge covering the area of the flexible display exposed to the rear surface of the second body when the first body and the second body are in the first state, and the frame is made of a Steel Use Stainless (SUS) material to which a magnetic force is applied.

6. The flexible display device of claim 5, wherein the second body further comprises a plurality of magnets arranged to be spaced apart from each other along the edge formed by the frame.

7. The flexible display device of claim 5, wherein the frame comprises a protrusion bent and protruding from a corner of the frame toward the second body.

8. The flexible display device of claim 7, wherein the second body further comprises a fixing clip disposed at a position corresponding to the protrusion of the frame, wherein at least a part of the protrusion is fixedly inserted into the fixing clip.

9. The flexible display device of claim 5, wherein the frame comprises
   an outside hook disposed on a first side of the edge formed by the frame to extend in a lengthwise direction of the edge, and
   wherein an outside hook groove into which the outside hook is inserted is formed in the second body.

10. The flexible display device of claim 9, wherein the frame further comprises
    an inside hook disposed on an opposite side of the edge that is opposite the first side, and protruding toward the second body, and
    wherein the inside hook is fixable by the rotary ejector.

11. The flexible display device of claim 10, wherein the outside hook groove is formed such that the outside hook is inserted into the outside hook groove in a diagonal direction, and
    wherein the inside hook is brought into contact with and fixed to a lower portion of a hook of the rotary ejector as the frame moves toward the second body after the outside hook is inserted into the outside hook groove.

12. The flexible display device of claim 11, wherein the hook of the rotary ejector comprises:
    a first surface supporting an upper surface of at least a part of the inside hook; and
    a second surface formed above the first surface and disposed adjacent to the frame or to the rear window, and
    wherein the first surface releases the upper surface of the at least a part of the inside hook and the second surface presses the frame or the rear window as the hook of the rotary ejector rotates.

13. The flexible display device of claim 5, wherein the frame comprises a side frame extending from the rectangular edge and surrounding one side surface of the second body.

14. The flexible display device of claim 13, wherein the frame further comprises a slide hook protruding and bent toward the second body,
    wherein an insertion groove into which the slide hook is inserted is formed at the second body, and
    wherein the frame is coupled with the second body such that the slide hook is inserted into the insertion groove in a first direction and then slides in a second direction perpendicular to the first direction.

15. The flexible display device of claim 14, wherein the rotary ejector rotates as an ejector pin presses the rotary ejector, and subsequently the rotary ejector presses the frame in a direction opposite to a direction in which the ejector pin presses the rotary ejector.

16. The flexible display device of claim 15, wherein the direction in which the rotary ejector presses the frame is opposite to a direction in which the frame is inserted into the insertion groove and slid to be fixed to the insertion groove.

17. The flexible display device of claim 16, wherein the rotary ejector comprises:
    a first hook protruding from the rotation shaft in a third direction, and pressed by the ejector pin; and
    a second hook protruding from the rotation shaft in a fourth direction opposite to the third direction, and pressing the frame.

18. The flexible display device of claim 17, wherein an insertion hole into which the ejector pin is inserted is formed at the side frame, and
    wherein the side frame comprises a protrusion that is pressed by the second hook as the second hook is rotated.

19. The flexible display device of claim 17, wherein the second body further comprises an elastic body pressing the first hook toward the side frame.

20. The device of claim 1, further comprising a prevention pad disposed to cover a gap between the flexible display and the second body, and configured to prevent foreign substances from entering the gap between the flexible display and the second body.

\* \* \* \* \*